US012669040B2

(12) United States Patent　　　　(10) Patent No.:　US 12,669,040 B2

Werries et al.　　　　　　　　　　(45) Date of Patent:　　Jun. 30, 2026

(54) AUTONOMOUS FLOW CONTROL DEVICE AND METHOD

(71) Applicant: NCS MULTISTAGE INC., Calgary (CA)

(72) Inventors: Michael Werries, Calgary (CA); Brock Gillis, Calgary (CA); Juan Montero, Calgary (CA); Doug Brunskill, Calgary (CA)

(73) Assignee: NCS Multistage Inc., Calgary (CA)

( * ) Notice: Subject to any disclaimer, the term of this patent is extended or adjusted under 35 U.S.C. 154(b) by 0 days.

(21) Appl. No.: 18/867,046

(22) PCT Filed: May 26, 2023

(86) PCT No.: PCT/CA2023/050727

§ 371 (c)(1),
(2) Date: Nov. 19, 2024

(87) PCT Pub. No.: WO2023/225759

PCT Pub. Date: Nov. 30, 2023

(65) Prior Publication Data

US 2025/0369318 A1　　　Dec. 4, 2025

Related U.S. Application Data

(60) Provisional application No. 63/365,427, filed on May 27, 2022, provisional application No. 63/365,428, filed on May 27, 2022.

(51) Int. Cl.
　　*E21B 43/12*　　　(2006.01)
　　*E21B 34/10*　　　(2006.01)
　　*F16K 3/26*　　　(2006.01)
(52) U.S. Cl.
　　CPC ............. *E21B 43/12* (2013.01); *E21B 34/10* (2013.01); *F16K 3/265* (2013.01); *E21B 2200/06* (2020.05)

(58) Field of Classification Search
　　CPC .......... E21B 43/12; E21B 34/10; E21B 34/08; E21B 2200/06; F16K 3/26; F16K 3/265
　　See application file for complete search history.

(56) References Cited

U.S. PATENT DOCUMENTS

2011/0139453 A1 * 6/2011 Schultz ................... E21B 43/12
　　　　　　　　　　　　　　　　　166/272.3
2012/0298370 A1 * 11/2012 Xu .......................... E21B 43/32
　　　　　　　　　　　　　　　　　166/316

(Continued)

FOREIGN PATENT DOCUMENTS

WO　　WO 2016/191584　　　12/2016
WO　　WO-2018161158 A1 * 9/2018　.............. E21B 34/14

(Continued)

OTHER PUBLICATIONS

International Search Report and Written Opinion for International (PCT) Patent Application No. PCT/CA2023/050727, dated Aug. 29, 2023, 9 pages.

*Primary Examiner* — Caroline N Butcher
(74) *Attorney, Agent, or Firm* — Sheridan Ross P.C.

(57)　　　　　　　ABSTRACT

A valve assembly for integration within a wellbore string is provided. The valve assembly includes a valve housing defining a fluid passage therethrough and having injection ports, and a flow restriction component extending between the fluid passage and the injection ports to establish fluid communication therebetween. The flow restriction component is configured to create a flowrate restriction along a flow path length thereof, with each injection port being aligned with respective portions of the flow restriction component to define respective flow path lengths defining respective degrees of flowrate restriction. The valve assembly also includes a flow adjuster connected to the valve housing and being fluid-pressure actuatable to align an outlet with one of the injection ports such that fluid flow between (Continued)

the fluid passage and the reservoir is restricted by a corresponding degree of flowrate restriction to maintain an injection rate substantially constant.

20 Claims, 16 Drawing Sheets

(56)                    References Cited

U.S. PATENT DOCUMENTS

| | | | |
|---|---|---|---|
| 2014/0034308 A1 | 2/2014 | Holderman et al. | |
| 2015/0369007 A1 | 12/2015 | George et al. | |
| 2018/0030812 A1 | 2/2018 | Ning et al. | |
| 2020/0355044 A1 | 11/2020 | Kratochvil | |
| 2021/0095551 A1 | 4/2021 | Johnson et al. | |

FOREIGN PATENT DOCUMENTS

| | | | | |
|---|---|---|---|---|
| WO | WO 2021/119852 | 6/2021 | | |
| WO | WO-2021119852 A1 * | 6/2021 | ............. | E21B 43/14 |
| WO | WO 2023/225759 | 11/2023 | | |

* cited by examiner

AUTONOMOUS FLOW CONTROL DEVICE AND METHOD

CROSS REFERENCE TO RELATED APPLICATIONS

This application is a national stage application under 35 U.S.C. 371 and claims the benefit of PCT Application No. PCT/CA2023/050727 having an international filing date of 26 May 2023, which designated the United States, and which PCT application claimed the benefit of U.S. Provisional Application No. 63/365,427 filed 27 May 2022 and U.S. Provisional Application No. 63/365,428 filed 27 May 2022, the contents of each of which are incorporated herein by reference in their entireties.

TECHNICAL FIELD

The present disclosure relates to devices, systems and methods for injecting fluid into a formation, or producing fluid from the formation, and more particularly to a valve deployable in a well and having an autonomously adjustable flow restriction component.

BACKGROUND

Over the lifetime of a well, various processes may be implemented for producing hydrocarbon material from or injecting fluid into a subterranean formation. Current well completions have various drawbacks to accommodate such different processes.

For instance, during injection operations, tubing pressure can be monitored but reservoir pressure is rarely known such that the size of the orifices through which fluids are injected is usually estimated based on desired goals and estimates. There are various challenges with respect to the manufacture, assembly, deployment and utilization of valve assemblies, and there is a need for a technology that addresses as least some of those challenges.

SUMMARY

According to an aspect, a valve assembly for integration within a wellbore string disposed within a subterranean reservoir is provided. The valve assembly includes a valve housing comprising a tubular wall defining a fluid passage therethrough and having a production port extending through the tubular wall; an inner barrel mounted within the valve housing and comprising a fluid channel adapted to establish fluid communication between the fluid passage and the production port, the fluid channel having a channel inlet and being configured to define a restricted flowrate in a first direction and an unrestricted flowrate in a second direction opposite the first direction, the production port being aligned with a portion of the fluid channel to define a channel inlet. The valve assembly also includes a flow adjuster operatively connectable to the valve housing and comprising an outer barrel slidably coupled about the tubular wall and having an outlet in fluid communication with the reservoir. The outer barrel and the tubular wall define a fluid chamber therebetween adapted to allow fluid flow therein. The outer barrel is adapted to shift along the tubular wall downhole upon pressurization of the fluid chamber to move the outlet relative to the production port to selectively enable or prevent fluid communication between the fluid passage and the reservoir through the production port. The flow adjuster includes a biasing element operatively connected to the outer barrel and being adapted to bias the outer barrel along the tubular wall uphole. The valve assembly is configurable between an open configuration, where the outer barrel is shifted to an open position, where the outlet is in fluid communication with the production port, and the fluid chamber is in fluid communication with the fluid channel to enable fluid communication between the reservoir and the fluid passage; and a closed configuration, where the outer barrel is shifted to a closed position, where the outlet is occluded by the tubular wall, the production port is occluded by the outer barrel and the fluid chamber is in fluid communication with the fluid channel. The flow adjuster being configured to autonomously shift the outer barrel from the installation position to the open position, and between the open position and the closed position based on a pressure differential between an internal pressure (Pi) of the fluid chamber and an external pressure (Pe) of the reservoir, wherein when Pi>Pe, the outer barrel is shifted to the closed position.

According to a possible implementation, the valve assembly is further configurable in an installation configuration, where the outer barrel is releasably secured to the tubular wall in an installation position and where the outlet is occluded by the tubular wall, the production port is occluded by the outer barrel, and the fluid chamber is fluidly sealed from the fluid channel to prevent fluid communication between the fluid passage and the reservoir and facilitate pressurization of the fluid chamber.

According to another aspect, a valve assembly for integration within a wellbore string disposed within a subterranean reservoir is provided. The valve assembly includes a valve housing comprising a tubular wall defining a fluid passage therethrough and having a production port extending through the tubular wall; a flow restriction component extending between the fluid passage and the production port to establish fluid communication therebetween, the flow restriction component being configured to create a flowrate restriction in a first direction and a substantially unrestricted flowrate in a second direction opposite the first direction, the production port being aligned with a portion of the fluid channel to define a channel inlet; and a flow adjuster operatively connectable to the valve housing and comprising an adjuster port in fluid communication with the reservoir, the flow adjuster being dynamically fluid-pressure actuatable to shift the adjuster port along the valve housing for alignment with the production port such that fluid flow between the reservoir and the fluid passage is enabled.

According to a possible implementation, wherein the fluid passage has an internal pressure (Pi), and the reservoir has an external pressure (Pe), and wherein the valve assembly is operable in an installation configuration, where the adjuster port is occluded by the tubular wall and the production port is occluded by the flow adjuster to prevent fluid communication between the reservoir and the fluid passage.

According to a possible implementation, when in the installation configuration, the valve assembly is fluid-pressure activatable to one of an open configuration and a closed configuration.

According to a possible implementation, wherein the flow adjuster comprises an occluding portion adapted to occlude the production port when in the installation configuration or the closed configuration.

According to a possible implementation, when the valve assembly is activated from the installation configuration to the open configuration, the flow adjuster is fluid-pressure actuated to align the adjuster port with the production port when the internal pressure is equal or less than the external pressure.

According to a possible implementation, when the valve assembly is activated from the installation configuration to the closed configuration, the flow adjuster is fluid-pressure actuated to occlude the production port when the internal pressure is greater than the external pressure.

According to a possible implementation, the flow adjuster comprises a flow adjuster barrel slidably coupled to the tubular wall and having the adjuster port extending therethrough, the flow adjuster barrel being adapted to slide along the tubular wall in a first direction when the internal pressure is greater than the external pressure, and in a second direction when the external pressure is greater than the internal pressure.

According to a possible implementation, the flow adjuster barrel is coupled about an outer surface of the tubular wall.

According to a possible implementation, the flow adjuster barrel and the tubular wall define a chamber therebetween having a chamber inlet in fluid communication with the fluid passage, the flow adjuster barrel comprising a radial surface defining a portion of the chamber, and wherein the flow adjuster barrel is adapted to slide along the tubular wall in the first direction as the internal pressure increases and fluid pressure applies a force on the radial surface.

According to a possible implementation, the chamber comprises a chamber outlet in fluid communication with the fluid passage, and wherein, when in the installation configuration, the chamber outlet is occluded by the flow adjuster barrel, and wherein when in the open and closed configurations, the chamber inlet is in fluid communication with the chamber outlet.

According to a possible implementation, when in the installation configuration, the flow adjuster barrel is releasably secured to the tubular wall.

According to a possible implementation, the valve assembly comprises installation seals installed on either side of the chamber inlet and configured to prevent fluid flow through interstices between the flow adjuster barrel and the tubular wall.

According to a possible implementation, the installation seals are made of polymeric material.

According to a possible implementation, the valve assembly further comprises operational seals installed between the flow adjuster barrel and the tubular wall to restrict fluid flow through interstices between the flow adjuster barrel and the tubular wall.

According to a possible implementation, the operational seals comprise laminar seals made up of a plurality of rings arranged side by side in radial grooves defined about the tubular wall.

According to a possible implementation, each ring defines a gap with the tubular wall, and wherein the gaps define a tortuous path through the laminar seal to restrict fluid flow therethrough.

According to a possible implementation, the flow adjuster barrel is adapted to be in sealing engagement with the tubular wall via the installation seals and the operational seals when in the installation configuration.

According to a possible implementation, the flow adjuster barrel is adapted to disengage the installation seals when operating the valve assembly from the installation configuration to the open configuration or the closed configuration.

According to a possible implementation, the flow adjuster further comprises a biasing element operatively connected to the flow adjuster barrel, the biasing element being adapted to bias the flow adjuster barrel along the tubular wall in the second direction.

According to a possible implementation, the biasing element comprises a spring coiled about the tubular wall between the flow adjuster barrel and a bottom sub of the valve housing.

According to a possible implementation, the spring is configured to create a compressive force to bias the flow adjuster barrel along the tubular wall in the second direction, and wherein a combination of the external pressure and the compressive force are substantially equivalent to the internal pressure when operating the valve assembly.

According to a possible implementation, the spring is adapted to return toward a neutral position when the external pressure is greater than the internal pressure in order to shift the flow adjuster barrel in the second direction, and wherein operating the valve assembly in the open configuration includes having the spring in the neutral position.

According to a possible implementation, the flow restriction component comprises a fluid channel.

According to a possible implementation, the fluid channel defines a Tesla valve configuration adapted to restrict fluid flow in one direction and enable a generally free flow in another direction.

According to a possible implementation, the valve assembly further includes a valve sleeve operatively connected with the valve housing, and wherein the fluid channel is defined by a groove provided in a surface of the valve sleeve and a corresponding opposed surface of the valve housing.

According to a possible implementation, the valve sleeve is located within the valve housing, and wherein the groove is defined in an outer surface of the valve sleeve, and the opposed surface of the valve housing is an inner surface thereof.

According to a possible implementation, the valve sleeve is fixedly connected with respect to the valve housing.

According to a possible implementation, the fluid channel comprises a channel outlet defined in an inner surface of the valve sleeve, the channel outlet being adapted to be in fluid communication with the groove, and wherein the production port of the valve housing defines a channel inlet.

According to a possible implementation, at least one of the channel inlet and the channel outlet comprises a flow control apparatus component configured to mitigate intake of undesired material into the groove, check for reverse flow, or both.

According to another aspect, a well completion system is provided. The well completion system includes a wellbore string comprising a plurality of valve assemblies installed in respective stages of a wellbore. The plurality of valve assemblies includes one or more injection valves, comprising a valve housing comprising a tubular wall defining a fluid passage therethrough and having injection ports extending through the tubular wall; a flow restriction component extending between the fluid passage and the injection ports to establish fluid communication therebetween, the flow restriction component being configured to create a fluid flowrate restriction along a flow path length, each injection port being aligned with respective portions of the flow restriction component to define respective flow path lengths defining respective degrees of flowrate restriction; and a flow adjuster operatively connectable to the valve housing and comprising an outlet in fluid communication with the reservoir, the flow adjuster being fluid-pressure actuatable based on a pressure differential between an internal pressure of the valve assembly and an external pressure of the corresponding stage of the reservoir to align the outlet with one of the injection ports such that fluid flow between the fluid passage and the reservoir is restricted by a corresponding degree of flowrate restriction to maintain an injection rate in each stage substantially constant to define a generally even or desired flow distribution along the wellbore. The valve assemblies also include one or more production valves, comprising a production valve housing comprising a production tubular wall defining a production fluid passage therethrough and having a production port extending through the production tubular wall; a production flow restriction component extending between the production fluid passage and the production port to establish fluid communication therebetween, the production flow restriction component being configured to create a flowrate restriction in a first direction and a substantially unrestricted flowrate in a second direction opposite the first direction, the production port being aligned with a portion of the production fluid channel to define a production channel inlet; and a production flow adjuster operatively connectable to the production valve housing and comprising an adjuster port in fluid communication with the reservoir, the flow adjuster being dynamically fluid-pressure actuatable to shift adjuster port along the production valve housing for alignment with the production port such that fluid flow between the reservoir and the production fluid passage is enabled; and a plurality of conduits connecting the plurality of valve assemblies in spaced-apart relation along the wellbore, the conduits being configured to establish fluid communication between the valve assemblies.

According to another aspect, a method for recovering fluids from a reservoir using the well completion system as defined above is provided. The method includes injecting an injection fluid down the wellbore string comprising injection and production valve assemblies operated in an installation configuration to pressurize the wellbore string and increase an internal pressure; fluid-pressure actuating the flow adjusters to operate the injection valve assemblies in an injection configuration, wherein the flow adjuster autonomously aligns the outlet with a corresponding one of the injection ports based on a pressure differential between the internal pressure of the injection valve assemblies and an external pressure of a corresponding injection stage of the reservoir; injecting fluid in said injection stages at the injection rate; fluid-pressure actuating the flow adjusters to operate the production valve assemblies in a production configuration, wherein the flow adjuster autonomously aligns the adjuster port with the production port based on a pressure differential between the internal pressure of the production valve assemblies and the external pressure of a corresponding production stage of the reservoir; and producing fluid from said production stages.

According to a possible implementation, the reservoir is a hydrocarbon-containing reservoir.

According to a possible implementation, the reservoir is fractured as part of a plug-and-perf operation.

According to a possible implementation, fluids are injected into the reservoir as part of a waterflooding operation.

According to a possible implementation, fluids are injected into the reservoir as part of a CO2 flooding operation.

According to a possible implementation, fluids are injected into the reservoir as part of acid solution mining operations.

According to a possible implementation, the reservoir is a geothermal reservoir.

According to a possible implementation, the steps of injecting fluids and producing fluids are done substantially simultaneously to enable synchronous frac-to-frac operations.

According to a possible implementation, the steps of injecting fluids and producing fluids are done subsequently to enable asynchronous frac-to-frac operations.

According to another aspect, a well completion system is provided. The well completion system includes a wellbore string comprising a plurality of valve assemblies installed in respective stages of a wellbore, the plurality of valve assemblies each comprising a valve housing comprising a tubular wall defining a fluid passage therethrough and having a port extending through the tubular wall; a flow restriction component extending between the fluid passage and the port to establish fluid communication therebetween, the flow restriction component being configured to create a flowrate restriction in a first direction and a substantially unrestricted flowrate in a second direction opposite the first direction, the port being aligned with a portion of the fluid channel to define a channel inlet; and a flow adjuster operatively connectable to the valve housing and comprising an adjuster port in fluid communication with the reservoir, the flow adjuster being dynamically fluid-pressure actuatable to shift the adjuster port along the valve housing for alignment with the port such that fluid flow between the reservoir and the production fluid passage is enabled. The completion system also includes a plurality of conduits connecting the plurality of valve assemblies in spaced-apart relation along the wellbore, the conduits being configured to establish fluid communication between the valve assemblies.

According to another aspect, a valve assembly for integration within a wellbore string disposed within a subterranean reservoir is provided. The valve assembly includes a valve housing comprising an outer barrel defining a longitudinal fluid passage therethrough and having injection ports radially extending therethrough; an inner barrel mounted within the valve housing and comprising a flow restriction component extending between the fluid passage and the injection ports to establish fluid communication therebetween, the flow restriction component being configured to create a flowrate restriction along a flow path length thereof, each injection port being in fluid communication with respective portions of the flow restriction component defining respective flow path lengths defining respective degrees of flowrate restriction; and a flow adjuster operatively connectable to the valve housing and comprising an outlet in fluid communication with the reservoir, the flow adjuster being fluid-pressure actuatable to align the outlet with any one of the injection ports.

According to another aspect, a valve assembly for integration within a wellbore string disposed within a subterranean reservoir is provided. The valve assembly includes a valve housing comprising an outer barrel enabling fluid flow in a longitudinal direction and having injection ports enabling fluid flow in a radial and outward direction; an inner barrel mounted within the valve housing for overlying the injection ports, the inner barrel comprising a flow restriction component at least partially defined between the outer barrel and the inner barrel, the flow restriction component being configured to establish fluid communication between the fluid passage and the injection ports while being shaped and sized to create resistance to fluids flowing along a flow length thereof, each injection port of the outer barrel being in fluid communication with respective portions of the flow restriction component defining respective flow lengths which create respective degrees of resistance to fluid flow;

and a flow adjuster operatively connectable to the valve housing and comprising an outlet in fluid communication with the reservoir, the flow adjuster being operable to align the outlet with any one of the injection ports to enable fluid communication between the fluid passage and the injection port aligned with the outlet, the flow adjuster being fluid-pressure actuatable to align the outlet between different injection ports to decrease variability of an injection rate of fluid into the reservoir.

According to another aspect, a valve assembly for integration within a wellbore string disposed within a subterranean reservoir is provided. The valve assembly includes a valve housing comprising an outer barrel enabling fluid flow in a longitudinal direction and having injection ports enabling fluid flow in a radial and outward direction; an inner barrel mounted within the valve housing over the injection ports, the inner barrel comprising a flow restriction component defined between the outer barrel and the inner barrel, the flow restriction component being configured to establish fluid communication between the fluid passage and the injection ports, the flow restriction component being shaped and sized to create resistance to fluids flowing along a flow length thereof, each injection port of the outer barrel being in fluid communication with respective portions of the flow restriction component defining respective flow lengths which create respective degrees of resistance to fluid flow; and a flow adjuster operatively connectable to the valve housing and comprising an outlet in fluid communication with the reservoir, the flow adjuster being operable to align the outlet with any one of the injection ports to enable fluid communication between the fluid passage and the injection port aligned with the outlet, the flow adjuster being fluid-pressure actuatable to align the outlet between different injection ports to provide a more sustained rate of fluid injection into the reservoir.

According to another aspect, a valve assembly for integration within a wellbore string disposed within a subterranean reservoir is provided. The valve assembly includes a valve housing comprising an outer barrel defining a longitudinal fluid passage therethrough and having a production port radially extending therethrough; an inner barrel comprising a flow restriction component extending between the fluid passage and the production port to establish fluid communication therebetween, the flow restriction component being configured to create a first resistance to flowrate in a first direction and a second resistance to flowrate in a second direction opposite the first direction, the first resistance being greater than the second resistance, the production port being aligned with a portion of the fluid channel to define a channel inlet; and a flow adjuster operatively connectable to the valve housing and comprising an adjuster port in fluid communication with the reservoir, the flow adjuster being dynamically fluid-pressure actuatable to shift the adjuster port along the valve housing for alignment with the production port.

DETAILED DESCRIPTION

Figure 1:
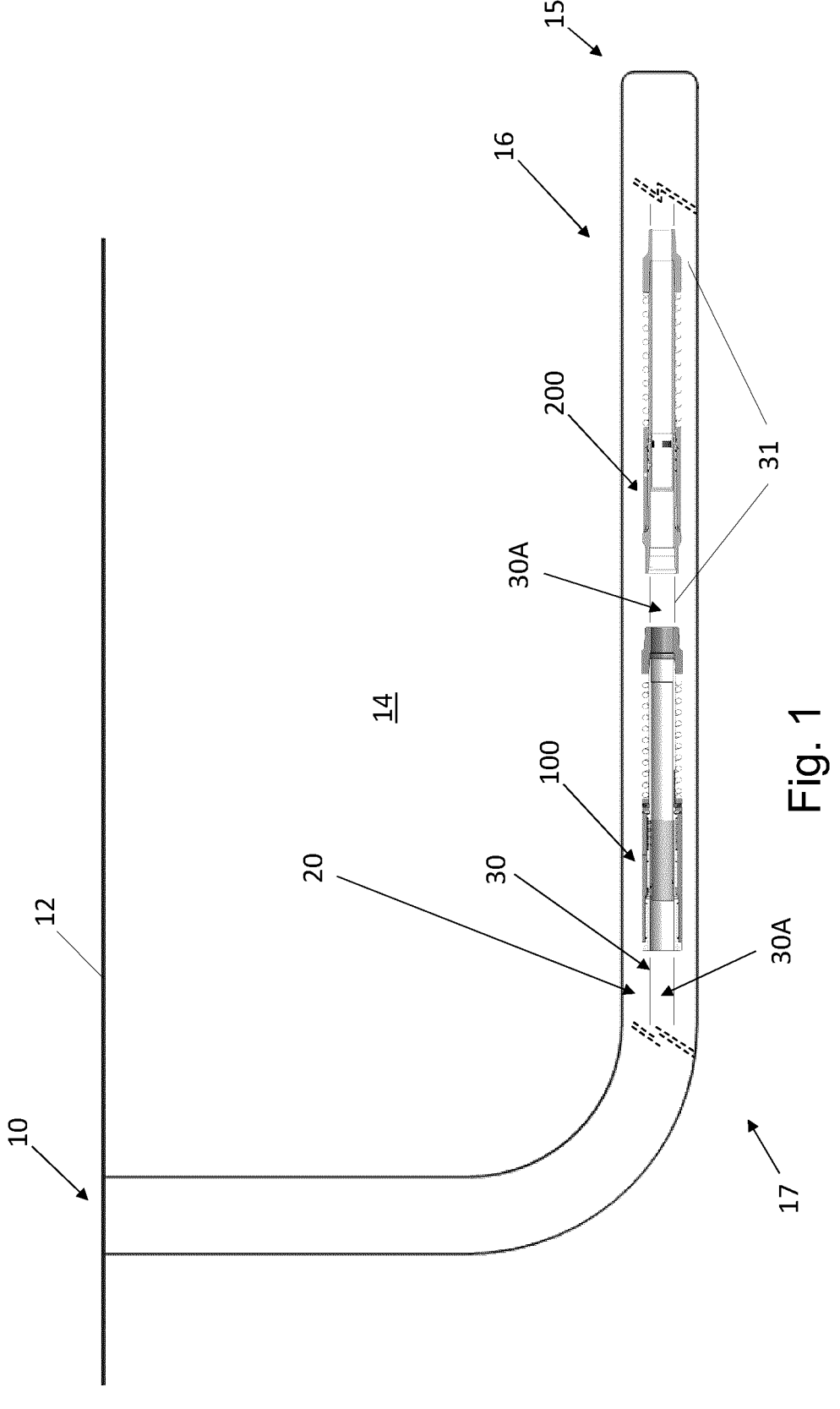
FIG. 1 is a transverse cut view of a wellbore extending in a reservoir and provided with valve assemblies.

As will be explained below in relation to various implementations, the present disclosure describes systems and methods for various in situ operations, such as the injection of fluids into subterranean reservoirs, or the recovery of hydrocarbon material from a subterranean reservoir using valve assemblies having an adjustable flow restriction component defining a fluid flow path. The present disclosure more particularly relates to a valve assembly which can be deployed in a well in a run-in configuration, such as a closed configuration, and is converted to an operational configuration, such as an open configuration, using fluid pressure for operation of a flow adjuster adapted to autonomously and dynamically open and close the valve to respectively enable and prevent fluid communication between a surrounding reservoir and the valve assembly. Alternatively, the valve assembly can be activated (e.g., operated from the run-in configuration to another operational configuration) using a tool, such as a downhole shifting tool.

The valve assembly can be integrated as part of a wellbore string, which can include injection valve assemblies, operable to inject fluid (e.g., a fluid for stimulating hydrocarbon production via a drive process, such as waterflooding, or via a cyclic process, such as "huff and puff") into the subterranean formation, and production valve assemblies, operable to produce reservoir fluids.

The injection valve assemblies (or simply injection valves) are operable between various configurations for allowing fluid to be injected into the reservoir at a predetermined, desired or generally constant flowrate. The injection valves include a flow regulator and an autonomous and dynamic flow adjuster adapted to define predetermined and/or desired fluid flowrate restrictions between the valve assembly and the reservoir to maintain an injection rate substantially constant. It should be understood that, as used herein, the expression "substantially constant" or "generally constant" can refer to fluid flowrates which remain in a desired range of flowrates, such as between 1% and 20% variation across a pressure differential of, for example, about 500 psi to about 2000 psi. This variation and/or pressure differential can be defined by any suitable type of valve, such as a valve designed to flow 10 cubic meters per day, or 100 cubic meters per day, etc, for example. It is thus appreciated that a desired range of flowrates can have a variability of 20% or less to remain generally constant, such as a variability of 15%, 10%, 5%, 2%, 1%, 0.5%, etc.

As will be described further below, the production valve assemblies (or simply production valves) can be operated for the recovery of fluids from the surrounding reservoir. The production valves include a flow regulator adapted to define a fluid flowrate restriction between the production valve and the surrounding reservoir to create a pressure differential between internal and external portions of the valve assembly. The production valves further include an autonomous and dynamic flow adjuster being fluid-pressure actuatable, via the pressure differential, to selectively open and close an outlet of the valve assembly.

In example implementations, the injection valve assembly includes a valve housing provided with housing ports extending therethrough. The injection valve assembly also includes a valve sleeve mounted within the housing and provided with a fluid channel extending between the wellbore string and the housing ports, where the housing ports are aligned with respective portions of the fluid channel to define flow paths of respective lengths. The fluid channel provides flow restriction, for example, due to its tortuous shape, such that the flow restriction is greater as fluid flows further along the fluid channel. The injection valve assembly also includes a flow control device (also referred to as a "flow adjuster" herein) coupled about the valve housing and provided with an opening, or outlet, communicating with the reservoir and adapted to be aligned with at least one of the housing ports. Therefore, fluid flowing along the wellbore string can flow into the fluid channel, toward the housing ports, and into the reservoir via the outlet of the flow adjuster. The flowrate of the fluid flowing along the fluid channel is restricted to a given degree according to the housing port with which the outlet is aligned.

In example implementations, the production valve assembly includes a valve housing provided with a housing port extending therethrough. The production valve assembly also includes a valve sleeve mounted within the housing and provided with a fluid channel extending between the wellbore string and the housing port, where the housing port is aligned with and defines an outlet of the fluid channel. The fluid channel is shaped and configured to create a flow restriction, for example, due to its tortuous shape. More specifically, the fluid channel is shaped to create a flow restriction in a first direction such that the fluid flow is regulated in the first direction, such as from the production valve assembly to the reservoir (e.g., during injection operations of the well). The fluid channel is further adapted to allow a generally unrestricted flow in a second direction opposite the first direction, such as from the reservoir to the production valve assembly (e.g., during production operations of the well). The valve assembly also includes a flow control device (or "flow adjuster") coupled about the valve housing and provided with an opening, or outlet, communicating with the reservoir and adapted to be aligned with the housing port. The flow restriction of the fluid channel creates a pressure differential during injection operations which actuates the flow adjuster to move the outlet from being in alignment with the housing port, thereby preventing fluid communication between the production valve assembly and the surrounding reservoir. The flow adjuster includes a biasing element configured to bias the outlet in alignment with the housing port such that, during production operations, the outlet and the housing port are aligned to enable production via the production valve assembly.

It is thus noted that, during injection operations, the injection valves are configured to open and establish fluid communication between the wellbore string and the reservoir in order to inject fluid at a substantially constant injection rate at corresponding stages, and the production valves are configured to close. Moreover, during production operations, the injection valves are shifted closed, and the production valves are shifted open to enable production of reservoir fluids at corresponding stages.

Broadly described, the autonomous flow control device of the injection valve assembly is configured to provide a constant injection flowrate into the reservoir for different operational parameters, such as operational pressures (e.g., the pressure at which fluids are injected into the wellbore), among others. In some implementations, the flow adjuster includes a piston mechanism, such as a spring-biased barrel, coupled about the valve housing and provided with a piston port, corresponding to the outlet of the injection valve communicating with the reservoir. The piston mechanism is fluid-pressure activatable to have the barrel slide along the valve housing in order to align the outlet with one of the housing ports, thereby enabling fluid communication between the wellbore string and the reservoir. As will be described further below, the flow adjuster is toollessly operable, i.e., does not require the intervention of downhole tools, such as shifting tools deployed on coiled tubing, to align the outlet with one of the housing ports. The flow adjuster can be activated and further actuated, at least in part, based on one or more operational parameters, such as a pressure differential between internal and external pressures of the injection valve assembly (e.g., internal fluid pressure or tubing pressure and external reservoir pressure). The flow adjuster adjusts the flowrate restriction based on said pressure differential for maintaining the flowrate of fluid being injected into the reservoir at corresponding stages substantially constant or sustained, even as the internal and/or external pressures fluctuate. In other words, the flow adjuster dynamically self-adjusts over the lifetime of the well and during various operations to prevent, or at least reduce variability in the injection rate of fluids into the reservoir.

For example, when the internal fluid pressure is relatively low (e.g., lower than the reservoir pressure), the piston mechanism is shifted to a position where the outlet remains occluded, at least partially eliminating the possibility of inflow from the reservoir to the injection valve assembly. Upon increasing the internal fluid pressure, for example, to slightly higher than the reservoir pressure, the piston mechanism is shifted to another position where the outlet becomes aligned with a top-most housing port, thereby defining a shortest flow path length between the wellbore string passage and the reservoir. Further increasing the internal fluid pressure causes the piston mechanism to shift to yet another position, where the outlet becomes aligned with subsequent housing ports defining progressively longer flow path lengths, leading to an increased flowrate restriction. In other words, the higher the fluid pressure in the wellbore string passage (e.g., relative to the reservoir pressure), the longer the fluid flow path becomes, resulting in a substantially constant fluid flowrate out of the outlet.

Broadly described, the autonomous flow control device of the production valve includes a piston mechanism, such as a spring-biased barrel, coupled about the valve housing and provided with a piston port, corresponding to the outlet of the production valve, which communicates with the reservoir. The outlet of the production valve is initially aligned with the housing port, and the piston mechanism is fluid-pressure activatable to have the barrel slide along the valve housing in order to misalign the outlet relative to the housing port, thereby preventing fluid communication between the wellbore string and the reservoir via the production valves. As will be described further below, the production flow adjuster is toollessly operable, i.e., does not require the intervention of downhole tools, such as shifting tools deployed on coiled tubing, to move the outlet relative to the housing port. The production flow adjuster is configured to open and close the outlet of the production valve based on a pressure differential between internal and external portions of the production valve.

For example, when the internal fluid pressure is relatively low (e.g., lower than the reservoir pressure), the piston mechanism is in a neutral position, where the outlet is aligned with the housing port of the production valve assembly, thereby enabling an inflow into the valve assembly (e.g., during production operations). Upon increasing the internal fluid pressure, for example, to slightly higher than the reservoir pressure, the piston mechanism is actuated to shift the outlet to another position, where it is no longer aligned with the housing port, thereby preventing fluid communication between the production valve and the reservoir. It is noted that internal pressures tend to rise during injection operations of a well, such that the production valves are adapted to autonomously close during injection, and autonomously open during production.

With reference to FIG. 1, a wellbore 10 extends from the surface 12 and into a reservoir 14. A well completion system 20 including one or more valve assemblies, including injection valve assemblies 100 and production valve assemblies 200, which can be integrated as part of a wellbore string 30 extending within the wellbore 10. The wellbore string 30 defines a wellbore string passage 30A for conducting fluid between the surface 12 and the reservoir 14. In some implementations, the valve assemblies each include at least one passage allowing fluid flow therethrough. It should therefore be understood that the valve assemblies include passages that can form part of the wellbore string passage 30A along at least a portion of the wellbore, such that fluid communication between the surface 12 and the reservoir 14 can be established via the valve assemblies 100, 200. More specifically, and as will be described below, the valve assemblies 100, 200 can be provided with one or more ports for establishing fluid communication between the wellbore string 30 and the reservoir 14 at respective stages. It is also noted that conduits 31 of the wellbore string 30 can be located on either end of a given valve assembly and can be coupled to respective ends thereof by any suitable method. It is also possible to connect some or all of the valve assemblies end-to-end without any intervening conduits 31.

The wellbore 10 can include a horizontal wellbore section 16 having a toe 15 and a heel 17 at respective ends thereof. It should be understood that, as used herein, the expression "toe" refers to an end region of the horizontal wellbore section, such as the end region furthest from surface. Similarly, the expression "heel", as used herein, refers to the opposite end region of the horizontal section, i.e., the beginning of the horizontal wellbore section 16, and may include at least part of the curved transition section between the horizontal and vertical sections of the wellbore 10. Therefore, the expressions "downhole" and "uphole" used herein can refer to directional features, where uphole is in a general direction towards the heel 17, and downhole is in a general direction towards the toe 15.

Injection Valve Assembly

Figure 2:
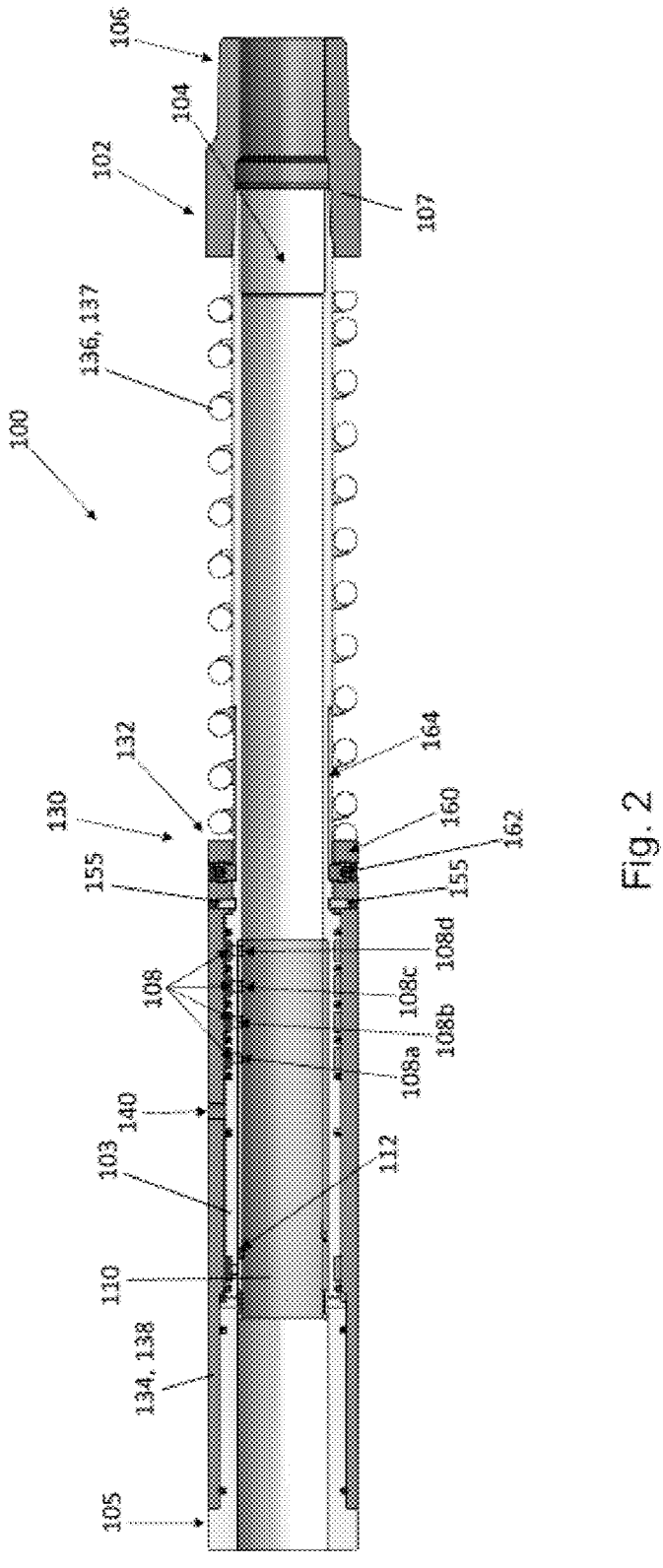
FIG. 2 is a cross-sectional view of an injection valve assembly according to an implementation.

With reference to FIGS. 1 and 2, an example implementation of the injection valve assembly 100 is illustrated. The injection valve assembly 100 includes a valve housing 102 having a tubular wall 103 defining a fluid passage 104 for allowing fluid to flow therethrough. The valve housing 102 has an uphole end 105 and a downhole end 106 adapted to be connected between lengths of conduits (or other valve assemblies) in order to integrate the injection valve assembly 100 within a wellbore string 30.

The valve housing 102 is provided with one or more housing ports 108 extending radially about the valve housing 102. In this implementation, the injection valve assembly 110 can be operated to inject fluids into the surrounding reservoir. As such, the housing ports 108 can also be referred to as injection ports. The injection ports 108 illustratively extend through the valve housing 102 (e.g., through a thickness of the tubular wall 103) for establishing fluid communication with a surrounding environment of the tubular wall 103. It is appreciated that the valve housing 102 can include any suitable number of injection ports 108 positioned in any suitable configuration. For example, in the illustrated implementation, the valve housing 102 includes four (4) injection ports 108 axially aligned along the valve housing 102. In some implementations, the injection ports 108 are distributed at generally regular intervals along a longitudinal axis of the valve housing 102, although other configurations are possible and may be used, such as distributing the injection ports at irregular intervals and/or at different radial positions about the tubular wall 103. The injection ports 108 can also have various cross-sectional areas and shapes, e.g., cylindrical, frustoconical, tapered inwardly or outwardly, rectangular with or without bevelled edges, etc.

In this implementation, the injection valve assembly 100 includes a valve sleeve 110, or inner barrel, mounted within the valve housing 102. The valve sleeve 110 can be held in place within the valve housing 102 using any suitable method, structure, or components, such as via an interference fit with the housing, via retaining rings (e.g., O-rings disposed about the valve sleeve), shear pins, a piston, etc., or a combination thereof. As will described further below, the valve sleeve 110 is provided with a flow restriction component (or "flow regulator") 112 extending between the housing ports 108 and the fluid passage 104 to establish fluid communication therebetween. The flow restriction component 112 is adapted to restrict fluid flowrate between the fluid passage 104 and the injection ports 108, and therefore restrict fluid flowrate between the fluid passage 104 and the reservoir.

Figure 3:
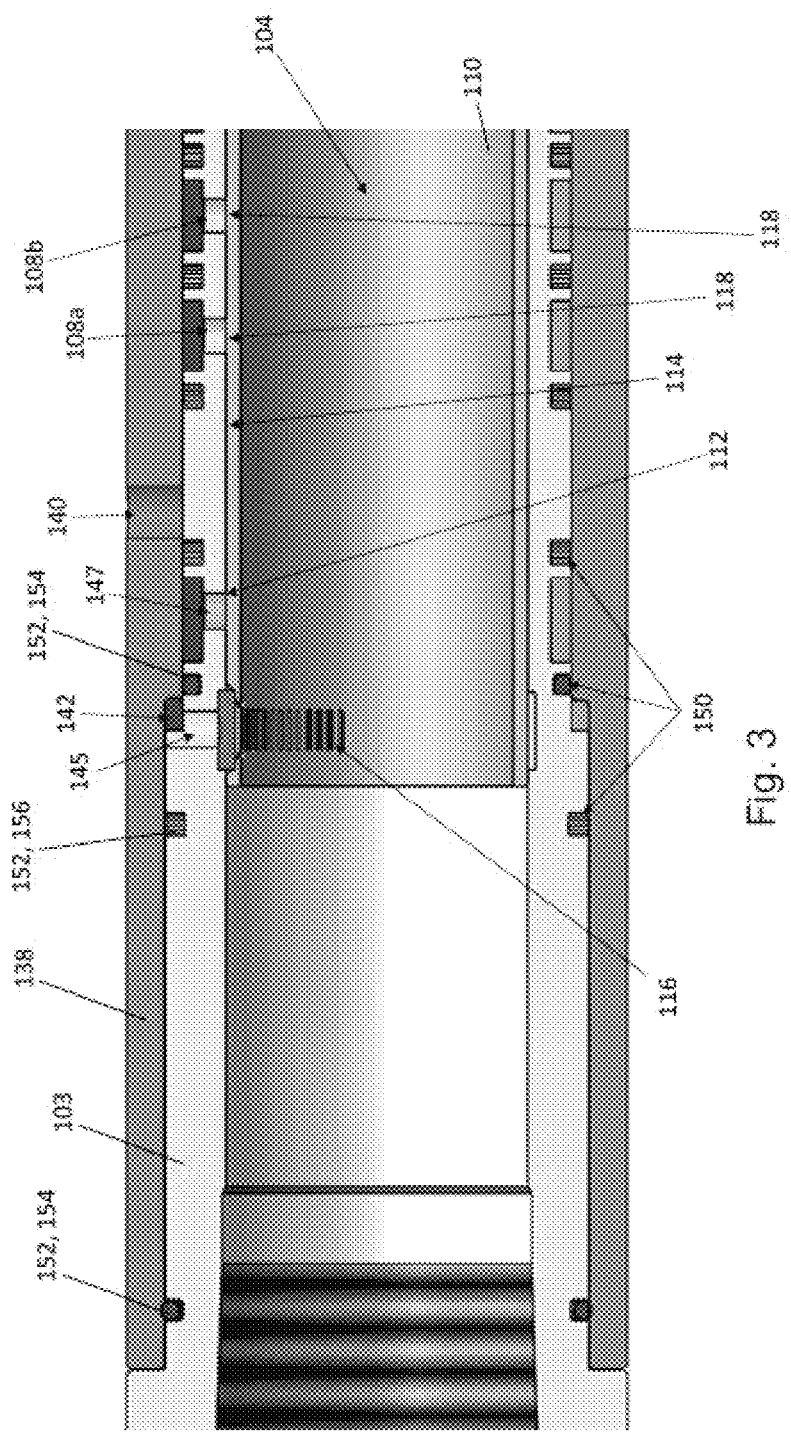
FIG. 3 is an enlarged view of another implementation of the injection valve assembly, showing channel inlet defined in a valve sleeve of the valve assembly.
Figure 4:
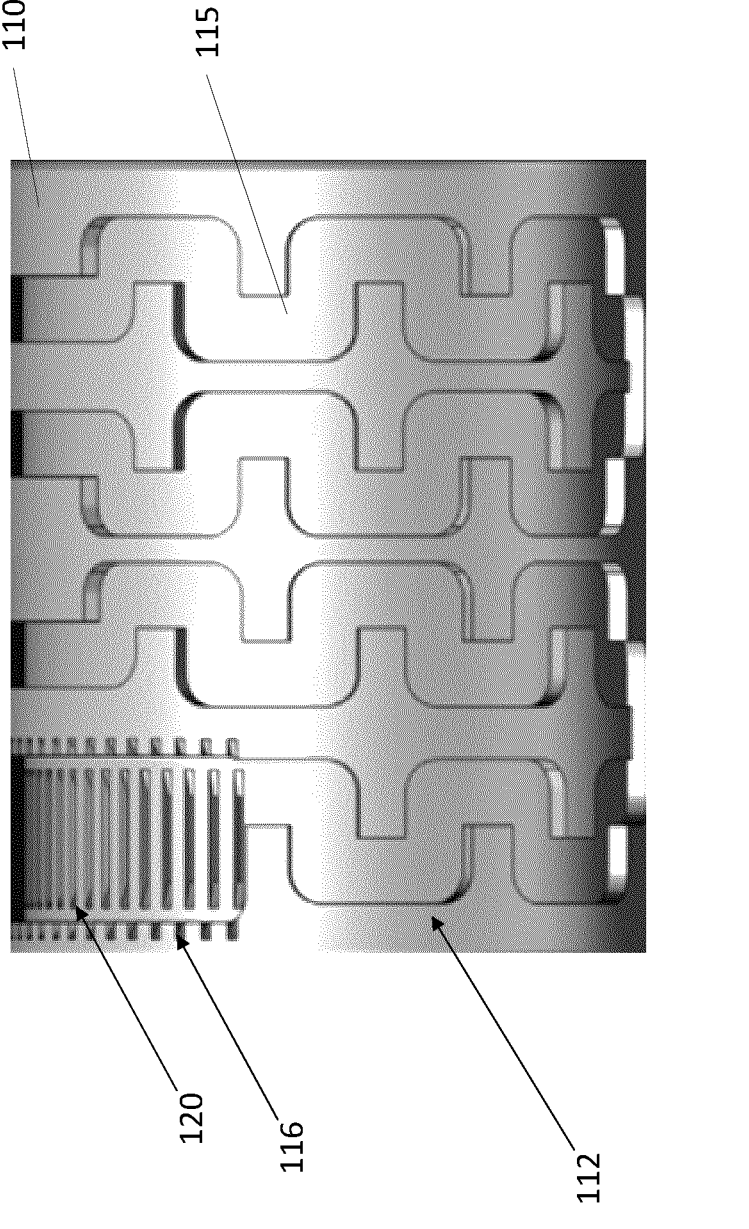
FIG. 4 is a partially cut view of the valve sleeve shown in FIG. 3, showing a tortuous fluid channel extending about the valve sleeve, according to an implementation.

The flow restriction component 112 can take various forms. For example, the valve sleeve 110 can be provided with a restricted passage configured to at least partially control, or adjust the flowrate of fluid flowing through the injection ports 108. With reference to FIGS. 3 and 4, in this implementation the valve sleeve 110 is provided with a fluid channel 114 shaped and adapted to allow fluid flow therethrough, and to fluidly connect the fluid passage 104 with the injection ports 108. The fluid channel 114 can be shaped and configured to provide a resistance to fluid flow, therefore providing additional control on the flowrate of fluid flowing through the injection ports 108. The fluid channel 114 can take the form of a tortuous path that winds (e.g., boustrophedonically) across a portion of the valve sleeve 110, such as circumferentially around a portion thereof. However, it is appreciated that the tortuous path can have various other configurations.

The fluid channel 114 can be defined between an outer surface of the valve sleeve 110 and an inner surface of a separate component, such as the valve housing 102 (e.g., the tubular wall 103). In this implementation, the valve sleeve 110 includes a groove 115 defined along the outer surface thereof with the inner surface of the valve housing overlaying and enclosing the groove 115, thereby defining the fluid channel 114 adapted to allow fluid flow therethrough. In the present implementation, the fluid channel 114 includes a channel inlet 116 defined through the valve sleeve 110, and a channel outlet 118, with the groove 115 extending between the inlet and the outlet. In this implementation, each injection port 108 overlays the groove 115 to enable fluid flowing along the channel 114 to flow through the injection ports 108. It is thus noted that the injection ports 108 define respective channel outlets 118 aligned along the valve housing 102.

In this implementation, the channel inlet 116 is adapted to allow fluid flow to enter the channel 114 and can include a filtering component 120 adapted to prevent, or at least partially prevent, an intake of oversized and/or solid material from entering the fluid channel 114. The filtering component 120 can be adapted to reduce the risk of the fluid channel 114 from becoming plugged or blocked by undesired material, such as cement slurry, entering the channel. The filtering component 120 can include any suitable structure to filter fluids flowing therethrough, such as a plurality of slots shaped and sized to at least partially prevent an intake of oversized and/or solid material, or a screen positioned over an inlet orifice, for example and among other possibilities.

As seen in FIG. 4, the groove 115 of the fluid channel 114 can take the form of a tortuous path having a plurality of generally 90-degree bends. It is appreciated that fluids flowing along the groove 115 can sustain a pressure drop due to the tortuous configuration of the groove 115. In addition, the groove 115 can extend circumferentially around the valve sleeve 110. It is noted that the groove 115 can have a length extending around the valve sleeve 110 any suitable number of times, such as once, twice, thrice, and so on. For instance, if the groove 115 has a smaller width it may require a shorter length to enable similar flow restriction properties when compared to a wider groove with a longer length. In this implementation, the groove 115 can alternatively, or additionally, double back on itself one or more times, for instance, rather than simply "spiral" around the valve sleeve 110.

With reference to FIGS. 2 and 3, the injection valve assembly 100 can further include a flow control device, or flow adjuster 130 operatively coupled to the valve housing 102 and configured to further control the flowrate of fluids flowing between the fluid passage 104 and the reservoir. The flow adjuster 130 can be adapted to vary the flow path length of the channel 114 along which fluid flows prior to being injected into the reservoir. For example, the flow adjuster can selectively close some injection ports 108 while keeping other injection ports 108 open and in fluid communication with the reservoir. As will be described further below, the flow adjuster 130 is configured to adjust the flowrate of fluid flowing between the fluid passage and the reservoir in order to maintain a substantially constant injection flowrate at different operational pressures. For instance, increasing the pressure within the fluid passage can actuate the flow adjuster 130 to increase the flow restriction provided by the flow restriction component (e.g., increase the flow path length of the fluid channel 114), thereby maintaining the flowrate constant.

It should be noted that increasing the flow path length of the channel 114 (or groove 115) can simultaneously mean increasing the number of bends along the groove, thereby increasing both the frictional pressure drop (due to the length of the groove) and the turbulence pressure drop (due to the number of bends). In other words, each additional bend in the tortuous configuration of the groove can be configured to add an equivalent additive degree of flow restriction.

In this implementation, the flow adjuster 130 includes a piston mechanism 132 having a piston body 134 operatively coupled to the valve housing 102, such as coupled about the tubular wall 103, and a biasing element 136, such as a spring 137, operatively connected to the piston body 134. The piston body 134 can include an outer barrel 138 coupled to the tubular wall 103 in a manner allowing the outer barrel to slide, or shift, from one position to another along a length of the tubular wall. The outer barrel 138 includes an outer port 140, or outlet, adapted to establish fluid communication between the valve housing 102 and the reservoir. More particularly, the outer barrel is operable to slide along the valve housing to align the outer port 140 with at least one of the injection ports 108, with the body of the outer barrel 138 occluding the other injection ports 108. In this implementation, the outer barrel 138 is adapted to occlude the injection ports 108, for example, by having a solid portion thereof overlay the injection ports 108. In the implementation of FIGS. 2 and 3, the portion of the outer barrel 138 occluding the injection ports 108 is downhole relative to the outer port 140. However, it should be noted that the outer barrel 138 can alternatively, or additionally, include an occluding portion provided uphole of the outer port 140. It is thus noted that, to inject fluid into the reservoir, fluids flow along the fluid passage 104, enter the fluid channel 114 and flows along a tortuous flow path length, and finally through the injection port(s) 108 with which the outer port 140 is aligned.

Figure 5:
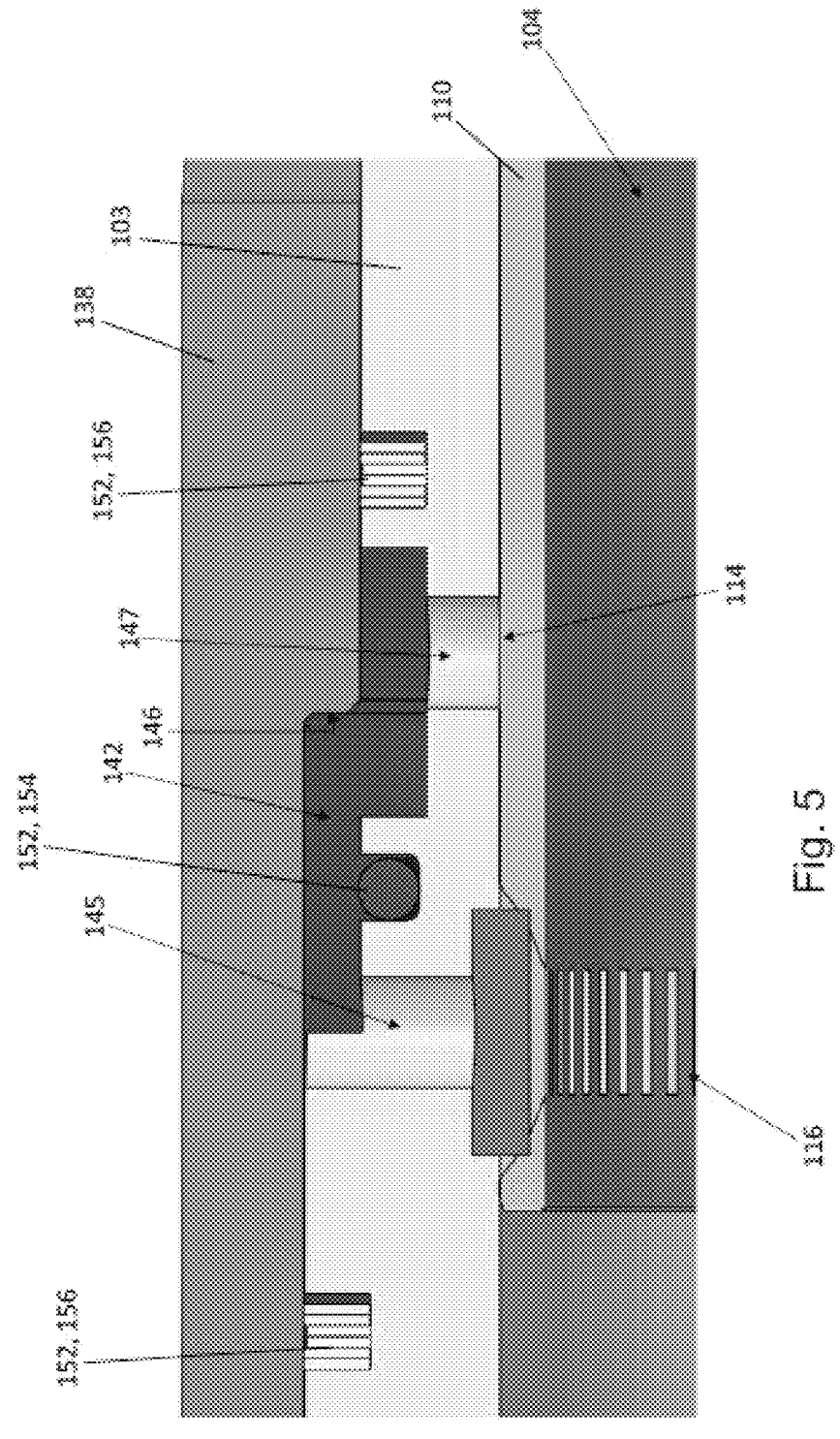
FIG. 5 is an enlarged view of FIG. 3, showing an open piston chamber establishing fluid communication between a chamber inlet and a chamber outlet, according to an implementation.

As seen in FIGS. 3 and 5, the piston mechanism can define a piston chamber 142 between the outer barrel 138 and the valve housing 102. In this implementation, the valve housing 102 includes a piston chamber inlet 145 establishing fluid communication between the fluid passage 104 and the piston chamber 142 to enable fluid to pressurize the piston chamber. The piston chamber 142 includes a piston surface against which fluid pressure can act to shift the outer barrel 138 downhole in order to align the outer port 140 with the injection ports 108. In this implementation, the piston surface corresponds to a radial surface 146 (seen in FIG. 5) of the outer barrel 138. It is noted that the radial surface 146 extends transversely (e.g., perpendicularly or at an angle) to the direction of travel of the outer barrel 138 such that fluid pressure within the piston chamber can apply a force on the radial surface. It is thus noted that the force generated on the radial surface will at least have a component thereof in the direction of travel of the outer barrel (e.g., in the axial direction). However, it is appreciated that other configurations are possible and may be used.

It should be noted that when the fluid pressure within the fluid passage 104 and piston chamber 142 is relatively low, but slightly higher than the reservoir pressure, the outer barrel can shift in the downhole direction, against the bias of the spring 137, and the outer port 140 can become aligned with a top-most injection port 108a. Upon increasing the fluid pressure, the outer barrel 138 is forced further downhole such that the outer port 140 becomes aligned with the subsequent injection ports 108b, 108c, 108d (FIG. 2) in the downhole direction, such that the flow path length of the fluid channel is increased, leading to an increased pressure drop between the fluid passage 104 and the reservoir. Inversely, reducing the internal fluid pressure enables the spring 137 to bias the outer barrel 138 in the uphole direction to align the outer port 140 with previous injection ports, thus reducing the flow path length of the fluid channel or completely closing the injection valve assembly.

Figure 7:
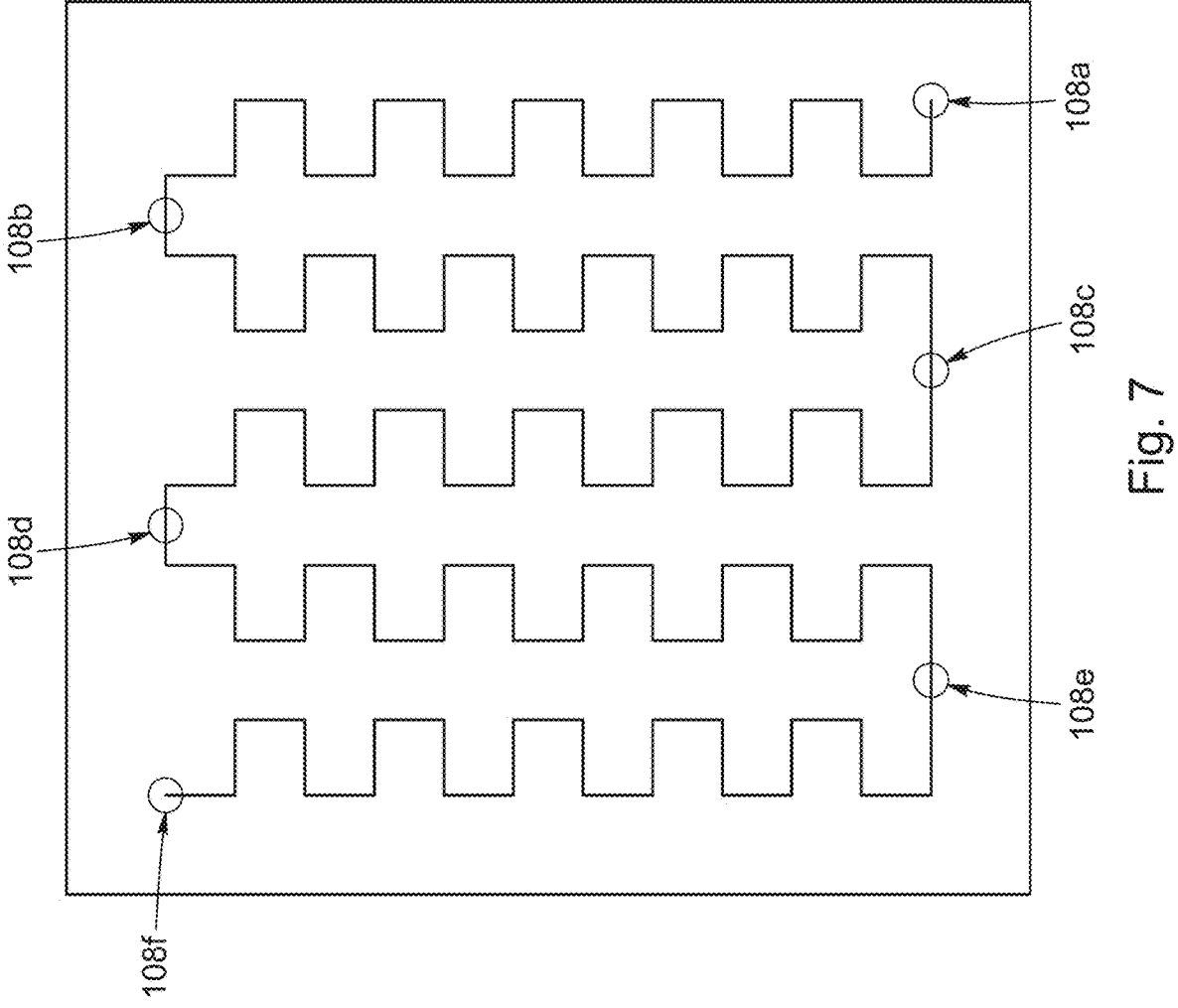
FIG. 7 is a schematic representation of the tortuous fluid channel, showing a plurality of positions where injection ports are adapted to be aligned with the tortuous fluid channel, according to an implementation.

In some implementations, the fluid channel 114 can be shaped and configured to enable operation of the injection valve assembly 100 in a similar fashion as a valve assembly comprising straight orifices extending through the housing 102 (e.g., without the flow restriction component). For example, and with reference to FIG. 7, positioning the outer port in a first position, such as in alignment with a first (e.g., top-most) injection port 108a enables the injection valve assembly to operate similar to a valve assembly with one or more straight orifices having a diameter of about 1.2 mm. In a similar fashion, positioning the outer port in a second position, in alignment with a second injection port 108b can be generally equivalent to having an orifice size of about 1.1 mm, and so on. For instance, a third injection port 108c can define a fluid channel length equivalent to having straight orifices having a diameter of about 1.0 mm, and positioning the outer port 140 in fourth, fifth and sixth positions in alignment with fourth, fifth and sixth injection ports 108d, 108e, 108f respectively, can be generally equivalent to having orifice sizes of about 0.9 mm, 0.8 mm and 0.7 mm, respectively, although other configurations and/or orifice equivalences are possible. Alternatively, instead of a tortuous fluid channel 114 for creating flow resistance, the valve assembly can be provided with a generally linear (e.g., straight) groove communicating with different orifices, such as orifices of varying size and/or geometry, with which the outer port can be aligned. It is thus noted that the flow resistance (or flow restriction) is created by the orifices themselves, rather than by the fluid channel communicating therewith.

Figure 6:
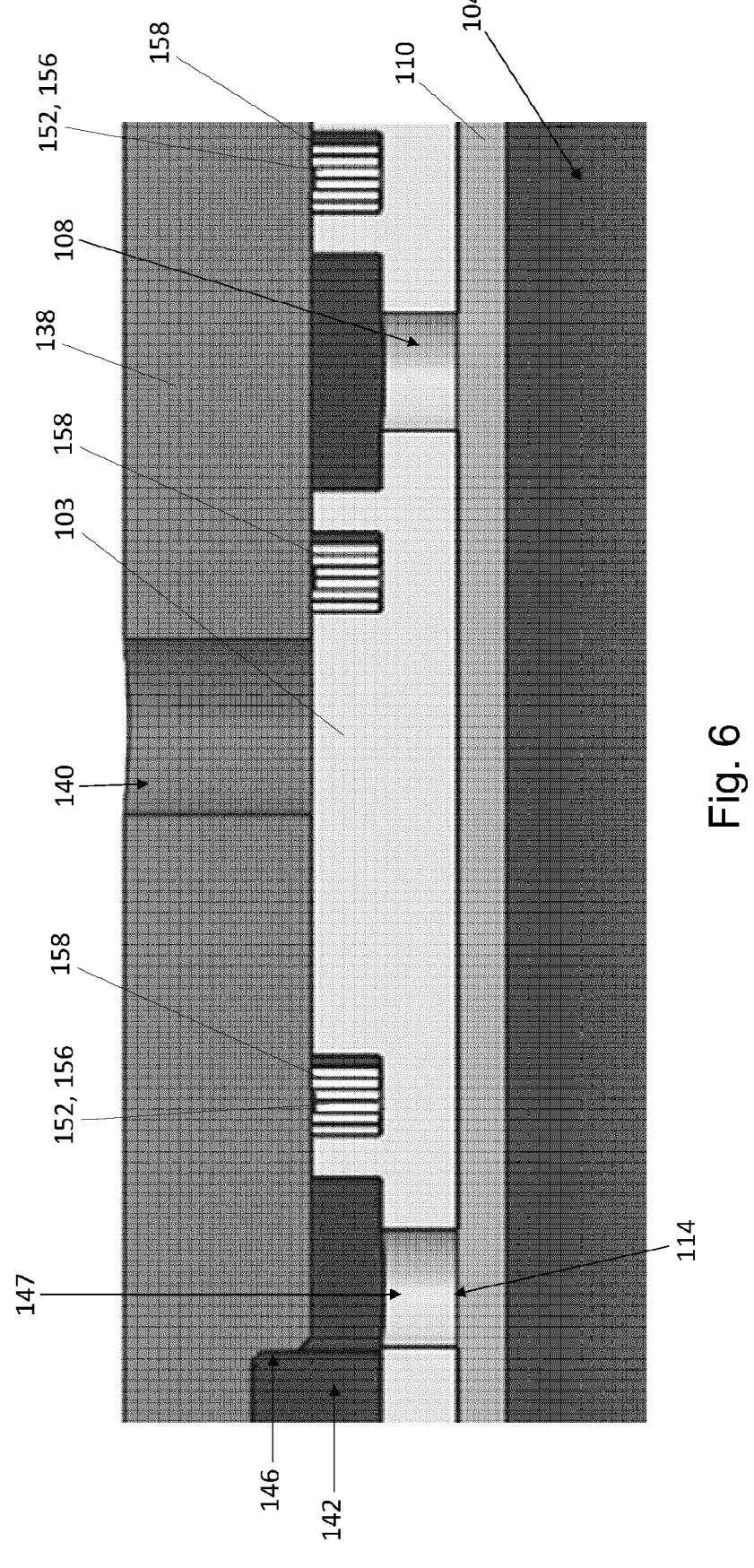
FIG. 6 is an enlarged view of FIG. 3, showing an outer port occluded by a tubular wall of the housing of the injection valve assembly, according to an implementation.

Referring back to FIGS. 3, 5 and 6, the valve sleeve 110 overlays the piston chamber inlet 145, with the channel inlet 116 being positioned to communicate with the piston chamber inlet 145, and therefore enable fluid flow within the piston chamber 142. As will be further described below, fluid flowing through the channel inlet 116 pressurizes the piston chamber 142 to shift the outer barrel 138 downhole, which establishes fluid communication between the piston chamber 142 and the fluid channel 114. In other words, fluid communication between the channel inlet 116 and the fluid channel 114 can be initially blocked prior to actuating the piston mechanism 132. As seen in FIGS. 3, 5 and 6, the tubular wall 103 can include a piston chamber outlet 147 adapted to establishing fluid communication between the piston chamber 142 and the fluid channel 114.

In this implementation, the injection valve assembly 100 includes a sealing assembly 150 adapted to at least partially seal interstices between the outer barrel 138 and the valve housing 102. The sealing assembly 150 can include a plurality of seals 152 disposed in respective radial grooves defined along the outer surface of the tubular wall 103, the inner surface of the outer barrel 138, or a combination thereof. In some implementations, the seals 152 include installation seals 154 configured to prevent any fluid flow through interstices between the outer barrel 138 and the tubular wall 103, and operational seals 156 configured to partially prevent fluid flow through interstices between the outer barrel 138 and the tubular wall 103.

As seen in FIG. 3, the sealing assembly 150 can include a pair of installation seals 154 installed about the tubular wall 103 and provided on either side of the piston chamber inlet 145. For example, the installation seals 154 can include polymer-based seals, such as O-rings, disposed between the outer barrel 138 and the tubular wall 103. As such, increasing the fluid pressure within the piston chamber 142 is facilitated by the presence of the installation seals 154, which prevent leaks through the interstices of the injection valve assembly and provides friction forces to at least partially prevent movement of the outer barrel 138 as the internal fluid pressure gradually increases.

With reference to FIGS. 5 and 6, once the outer barrel 138 shifts downhole, e.g., due to the increasing fluid pressure, the outer barrel disengages the installation seals 154, and fluid communication between the piston chamber inlet 145 and the piston chamber outlet 147 is established to enable fluid flow into the fluid channel. The outer barrel 138 remains in sealing engagement with the tubular wall 103 via the operational seals 156. In this implementation, the operational seals 156 are imperfect seals and can include laminar seals 158, or low-friction seals, which have low drag, low contact pressure and are anti-galling to create less friction forces (e.g., compared to the installation seals 154) such that movement of the outer barrel 138 is facilitated. The laminar seals 158 can be metallic to enable operations at high temperatures (e.g., 200° C. to 600° C.) and are configured to restrict fluid flow through interstices in the injection valve assembly, without completely preventing it.

The laminar seals 158 can include a plurality of rings coupled about the tubular wall 103. The rings of the laminar seals 158 may be arranged side by side in radial grooves defined about the tubular wall 103. Each ring can be arranged in the radial groove in a manner defining a gap in the circumference of the ring to allow fluid flow through the ring. The gaps of adjacent rings may or may not be aligned such that the gaps of a plurality of rings installed in a same radial groove can be adapted to define a tortuous path through the laminar seal 158, which restricts fluid flow therethrough.

Referring broadly to FIGS. 1 to 7, the injection valve assembly 100 can be configurable between an installation configuration (or "run-in" configuration), where the wellbore string can be deployed down the wellbore and fluids can gradually start flowing along the fluid passage 104; a closed configuration, where fluids flow along the fluid passage 104, but fluid communication between the wellbore string and the reservoir via the injection valve assembly is prevented; and an open configuration, where fluid communication between the wellbore string and the reservoir via the injection valve assembly is established. It should be noted that the open configuration can be defined by aligning the outer port 140 of the outer barrel 138 with at least one of the different injection ports 108.

Referring more specifically to FIGS. 2 and 3, the injection valve assembly 100 is illustrated in the installation configuration. The flow adjuster 130 is configured to position the outer barrel 138 in an occluding position to occlude each injection port 108, and to have the outer port 140 overlay the tubular wall 103 to prevent inflow from the reservoir. As mentioned, the outer barrel 138 engages the sealing assembly 150, including both the installation and operational seals 154, 156, when in the installation configuration. As such, the piston chamber 142 is fluidly sealed and fluid pressure can gradually increase along the fluid passage 104 (and within the piston chamber) without actuating the piston mechanism 132 (e.g., without displacing the outer barrel 138). In some implementations, the outer barrel 138 can be releasably coupled to the tubular wall 103 with shear pins 155 extending radially through the outer barrel 138 and into the tubular wall 103.

The installation configuration of the injection valve assembly 100 can be useful for performing interventionless pressure tests downhole (e.g., down the wellbore) as the injection valve assembly remains closed and prevents fluid communication between the fluid passage 104 and the surrounding reservoir. More particularly, the pressure differential between the internal, or tubing pressure (e.g., the pressure within the injection valve assembly) and the external, or reservoir pressure governs, at least in part, the operation of the flow adjuster 130, including the possible movements of the outer barrel 138. As such, the internal pressure can be increased to match, and eventually surpass the reservoir pressure, which activates the flow adjuster 130. Once the flow adjuster is activated, the reservoir pressure can be estimated based on the monitored tubing pressure and flow rates.

In some implementations, activating the flow adjuster 130 can correspond to configuring the injection valve assembly 100 from the installation configuration to one of the closed and open configurations. For instance, increasing the internal pressure of the fluid passage 104 to surpass the external pressure of the reservoir actuates the piston mechanism 132, and the outer barrel 138 is shifted downhole. With reference to FIGS. 5 and 6, the valve assembly 100 is shown in the closed configuration, where the outer barrel 138 no longer engages or contacts the installation seals 154 and is adapted to slide along the tubular wall 103. Similar to the installation configuration, in the closed configuration, the outer barrel 138 occludes the injection ports 108, and the outer port 140 overlays the tubular wall 103 such that fluid communication between the fluid passage and the reservoir, in either direction, is prevented.

Referring back to FIG. 2, the spring 137 of the piston mechanism 132 is illustratively spaced from a bottom sub 107 when in the installation configuration. Once the flow adjuster is activated and shifted downhole to disengage the installation seals 154, the spring 137 abuts against a surface of the bottom sub 107. In some implementations, the spring 137 can be in abutment with the bottom sub 107 in a neutral position, where the spring 137 is not compressed. The spring can be in the neutral position when the injection valve assembly is in the closed configuration. It should thus be understood that, once in the closed configuration, increasing the internal pressure further shifts the outer barrel 138 downhole (e.g., toollessly/autonomously) to align the outer port 140 with one of the injection ports 108, thereby compressing the spring 137. In other words, the injection valve assembly is configurable from the closed configuration to the open configuration by increasing the internal pressure. It is appreciated that upon decreasing the internal pressure, the spring 137 will bias the outer barrel uphole as the spring returns to its neutral position, thereby configuring the injection valve assembly back to the closed configuration.

It is thus noted that, once the flow adjuster is initially activated to disengage the installation seals 154, the outer barrel 138 will not autonomously return to its "run-in" position (e.g., overlaying and/or in engagement with the installation seals) since the spring 137 is adapted to return to its neutral position, which pushes the outer barrel 138 in the uphole direction, in a closed position spaced from the installation seals 154.

Still referring to FIG. 2, in this implementation, the injection valve assembly 100 includes guiding elements 160 configured to guide the movement of the outer barrel 138 as it slides along the tubular wall 103. The guiding elements 160 can include guiding studs 162 coupled to one of the outer barrel 138 and tubular wall 103, and guiding channels 164 defined along the other one of the outer barrel 138 and tubular wall 103. The guiding studs 162 are adapted to extend within the guiding channels 164 and slide therealong during movement of the outer barrel 138. The guiding studs 162 can be provided circumferentially around the outer barrel 138, and are illustratively provided proximate a bottom end thereof. It should be noted that the tubular wall 103 includes a corresponding number of guiding channels 164 for receiving respective guiding studs therein. Furthermore, each guiding channel 164 is shaped and adapted to prevent rotational movement of the outer barrel 138 about the tubular wall 103. Moreover, the guiding channels 164 can be adapted to limit the range of motion of the outer barrel 138 along the tubular wall 103. For example, the guiding studs 162 can be adapted to abut at either ends of the guiding channel 164, thereby preventing further movement in that direction. This can be useful in preventing over extension of the outer barrel 138, potentially damaging the spring 137, or disassembling or uncoupling the flow adjuster from the valve housing 102. In some implementations, the guiding channels 164 can be defined in a thickness of the tubular wall 103 (e.g., superficial grooves), or can include openings extending through the tubular wall 103.

Now referring to FIGS. 8 to 11, the open configuration of the injection valve assembly 100 can correspond to various different positions of the outer barrel 138. More specifically, the outer barrel 138 is adapted to slide along the tubular wall to align the outer port with one of the injection ports 108, thereby enabling injection of fluids from the fluid passage 104 to the reservoir. As the internal pressure increases, the outer barrel slides further downhole, acting against the spring 137 bias, to align the outer port 140 with injection ports 108 defining progressively longer fluid flow paths, which makes the fluid channel correspondingly more restrictive to maintain the flowrate of fluids being injected in the reservoir substantially constant. In other words, the higher the fluid pressure in the fluid passage, the longer the fluid path becomes, resulting in a generally constant fluid flow rate out of the outer port.

Figure 8:
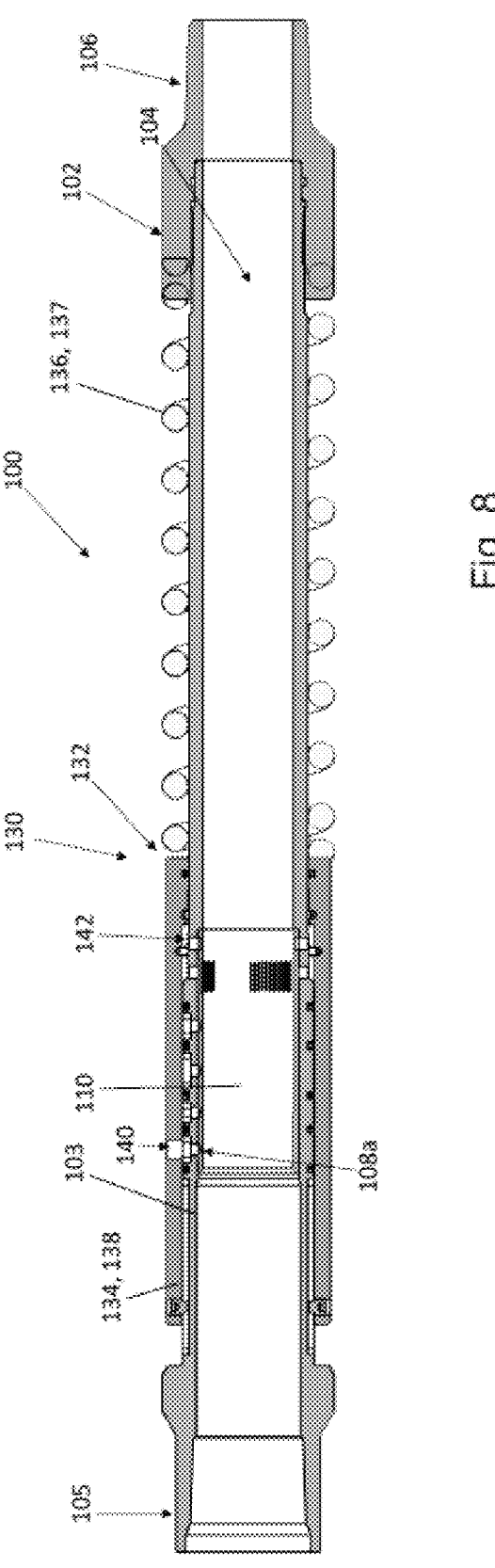
FIG. 8 is a cross-sectional view of an injection valve assembly, showing the valve assembly is a first open position with the housing port aligned with a first injection port, according to an implementation.
Figure 9:
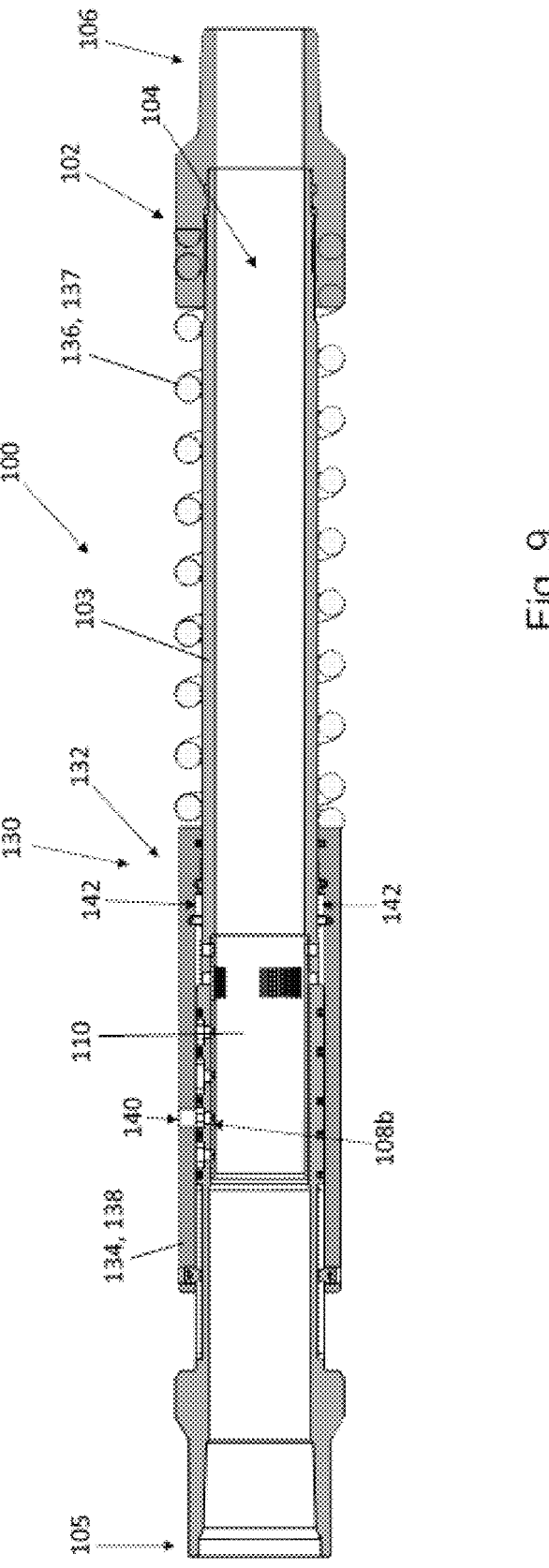
FIG. 9 is a cross-section view of the injection valve assembly shown in FIG. 8, showing the valve assembly is a second open position with the housing port aligned with a second injection port, according to an implementation.
Figure 10:
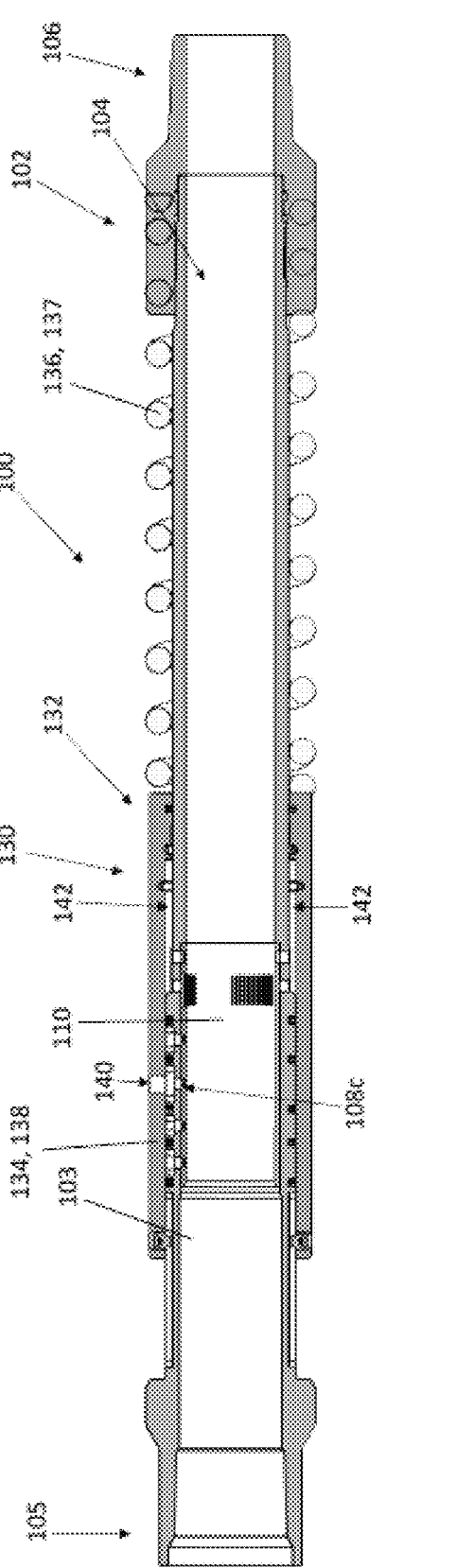
FIG. 10 is a cross-section view of the injection valve assembly shown in FIG. 8, showing the valve assembly is a third open position with the housing port aligned with a third injection port, according to an implementation.
Figure 11:
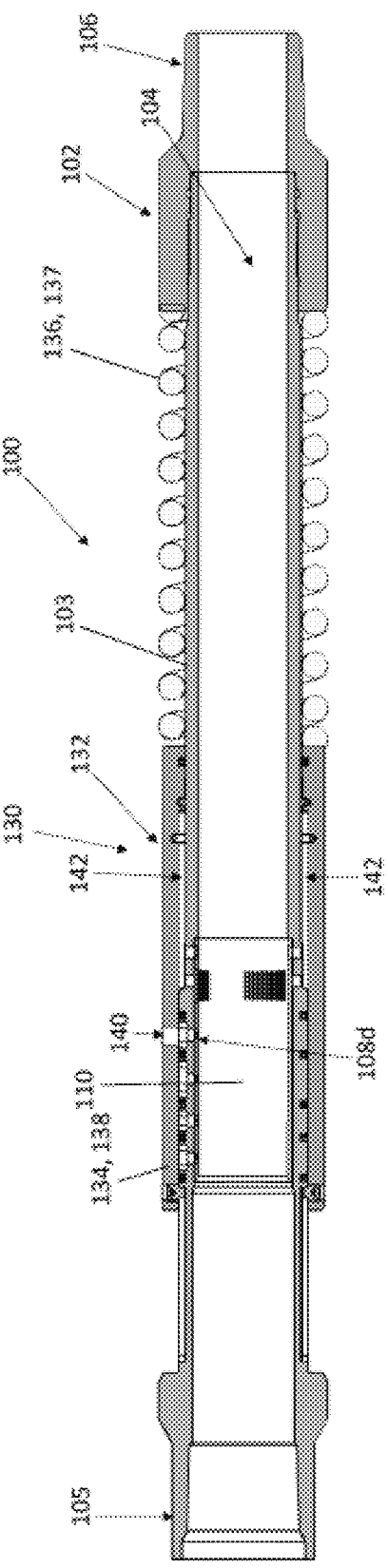
FIG. 11 is a cross-section view of the injection valve assembly shown in FIG. 8, showing the valve assembly is a fourth open position with the housing port aligned with a fourth injection port, according to an implementation.

As seen in FIG. 8, the valve assembly is shown in the open configuration, with the outer barrel 138 being in a first open position. In this implementation, the first open position corresponds to an alignment of the outer port 140 with the top-most injection port 108a, which defines a first flow path length (L1). The outer barrel can be shifted to the first position when the fluid pressure with the valve assembly is at a first internal pressure (Pi1). As the internal pressure increases, such as to a second internal pressure (Pi2), the outer barrel is shifted to a second open position, and the outer port is aligned with the second injection port (seen in FIG. 9), which defines a second flow path length (L2). It is appreciated that the second internal pressure is greater than the first internal pressure (Pi2>Pi1), and the second flow path length is also greater than the first flow path length (L2>L1). Further increasing the internal pressure, such as to a third internal pressure (Pi3) and a fourth internal pressure (Pi4) can cause the outer barrel to shift to a third open position (FIG. 10) and fourth open position (FIG. 11), respectively aligning the outer port with the third and fourth injection ports 108c, 108d, which define respective flow path lengths (L3 and L4). It should thus be understood that Pi4>Pi3>Pi2>Pi1, and that L4>L3>L2>L1. This configuration enables the injection flowrate to be maintained substantially constant.

It is noted that, when in the open configuration, the degree of movement of the outer barrel is determined by a balance between the fluid pressure acting on the piston surface and the spring bias. If the force generated by the spring is greater than the force generated by the fluid pressure, the outer barrel will be pushed uphole to a previous open position (e.g., defining a shorter fluid path length) or to the closed position. When in the closed configuration, the laminar seals (e.g., the imperfect seals) can enable leaks through the outer port to prevent excessive wax or scale buildup in the injection valve assembly and along the wellbore.

Production Valve Assembly

Figure 12:
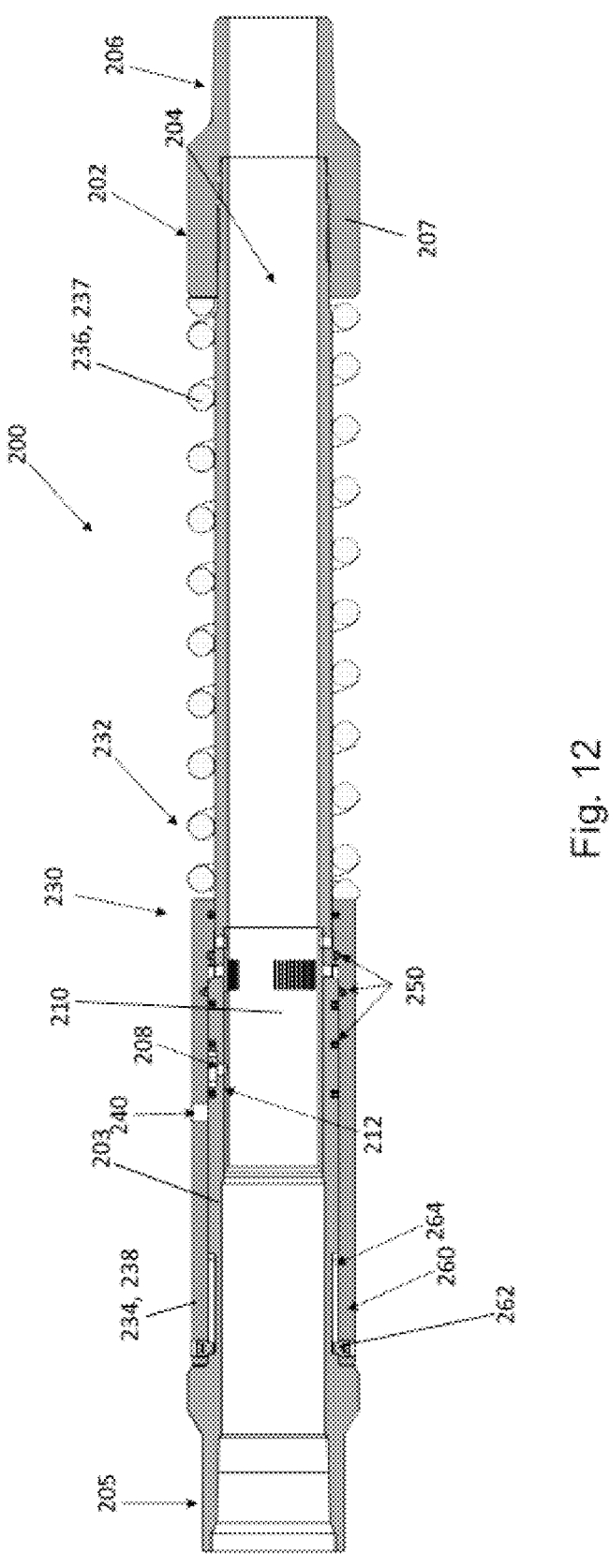
FIG. 12 is a cross-sectional view of a production valve assembly, showing the valve assembly is an installation configuration, according to an implementation.

With reference to FIGS. 1 and 12, an example implementation of a production valve assembly 200 is illustrated. The production valve assembly 200 includes a valve housing 202 having a tubular wall 203 defining a fluid passage 204 for allowing fluid to flow therethrough. The valve housing 202 has an uphole end 205 and a downhole end 206 adapted to be connected between lengths of conduits (or other valve assemblies) in order to integrate the injection valve assembly 200 within a wellbore string 30.

The valve housing 202 is provided with one or more housing ports 208 extending radially about the valve housing 202. The production valve assembly 200 can be operated to produce fluids from the surrounding reservoir, such as hydrocarbon-containing fluids, for example. In this implementation, the production valve 200 includes a single housing port 208, which can also be referred to as a production port 208. The production port 208 illustratively extends through the valve housing 202 (e.g., through a thickness of the tubular wall 203) for establishing fluid communication between a surrounding environment of the tubular wall 203 (e.g., the reservoir). It is appreciated that the production port 208 can be positioned at any suitable axial and/or radial location along and/or about the tubular wall 203. The production port 208 can also have various cross-sectional areas and shapes, e.g., cylindrical, frustoconical, tapered inwardly or outwardly, rectangular with or without bevelled edges, etc.

In this implementation, the production valve assembly 200 includes a valve sleeve 210, or inner barrel, mounted within the valve housing 202. The valve sleeve 210 can be held in place within the valve housing 202 using any suitable method, structure, or components, such as via an interference fit with the housing, via retaining rings (e.g., O-rings disposed about the valve sleeve), shear pins, a piston, etc., or a combination thereof. As will described further below, the valve sleeve 210 is provided with a flow restriction component (or "flow regulator") 212 extending between the production port 208 and the fluid passage 204 to establish fluid communication therebetween. The flow restriction component 212 is adapted to restrict fluid flowrate between the fluid passage 204 and the production port 208, and therefore restrict fluid flowrate between the fluid passage 204 and the reservoir.

The flow restriction component 212 can take various forms. For example, the valve sleeve 210 can be provided with a restricted passage configured to at least partially control, or adjust the flowrate of fluid flowing through the production port 208. With reference to FIGS. 12 to 15, in this implementation the valve sleeve 210 is provided with a fluid channel 214 shaped and adapted to allow fluid flow therethrough, and to fluidly connect the fluid passage 204 with the production port 208. The fluid channel 214 can be shaped and configured to provide a resistance to fluid flow, therefore providing additional control on the flowrate of fluid flowing through the production port 208. The fluid channel 214 can take the form of a tortuous path that winds across a portion of the valve sleeve 210, such as circumferentially around a portion thereof, for example. However, it is appreciated that the tortuous path can have various other configurations.

For example, in this implementation, the fluid channel 214 can be defined between an outer surface of the valve sleeve 210 and an inner surface of a separate component, such as the valve housing 202 (e.g., the tubular wall 203). In this implementation, the valve sleeve 210 includes a groove 215 defined along the outer surface thereof with the inner surface of the valve housing overlaying and enclosing the groove 215, thereby defining the fluid channel 214 adapted to allow fluid flow therethrough. In the present implementation, the fluid channel 214 includes a channel inlet 216 and a channel outlet 218 defined through the valve sleeve 210, with the groove 215 extending between the inlet and the outlet. In this implementation, the production port 208 overlays the groove 215 to enable fluids from the surrounding reservoir to flow through the production port 208 and enter the channel 214. It is thus noted that the production port 208 defines the channel inlet 216, or at least a portion thereof.

In this implementation, the channel inlet 216 is adapted to allow fluid flow to enter the channel 214 and can include a filtering component 220 adapted to prevent, or at least partially prevent, oversized and/or solid material from entering the fluid channel 214. The filtering component 220 can be adapted to reduce the risk of the fluid channel 214 from becoming plugged or blocked by undesired material entering the channel. The filtering component 220 can include any suitable structure or components to filter fluids flowing therethrough, such as a plurality of slots shaped and sized to at least partially prevent an intake of oversized and/or solid material, a screen positioned over an inlet orifice, or a check valve, for example and among other possibilities.

In some implementations, the fluid channel 214 is adapted to restrict fluid flow in one direction, while enabling a generally free flow in another direction. For example, the fluid channel can be shaped and configured to restrict fluid flow from the channel outlet 218 toward the production port 208 (e.g., during injection operations), and allow a generally unrestricted fluid flow from the production port 208 toward the channel outlet 218 (e.g., during production operations).

Figures 14, 15:
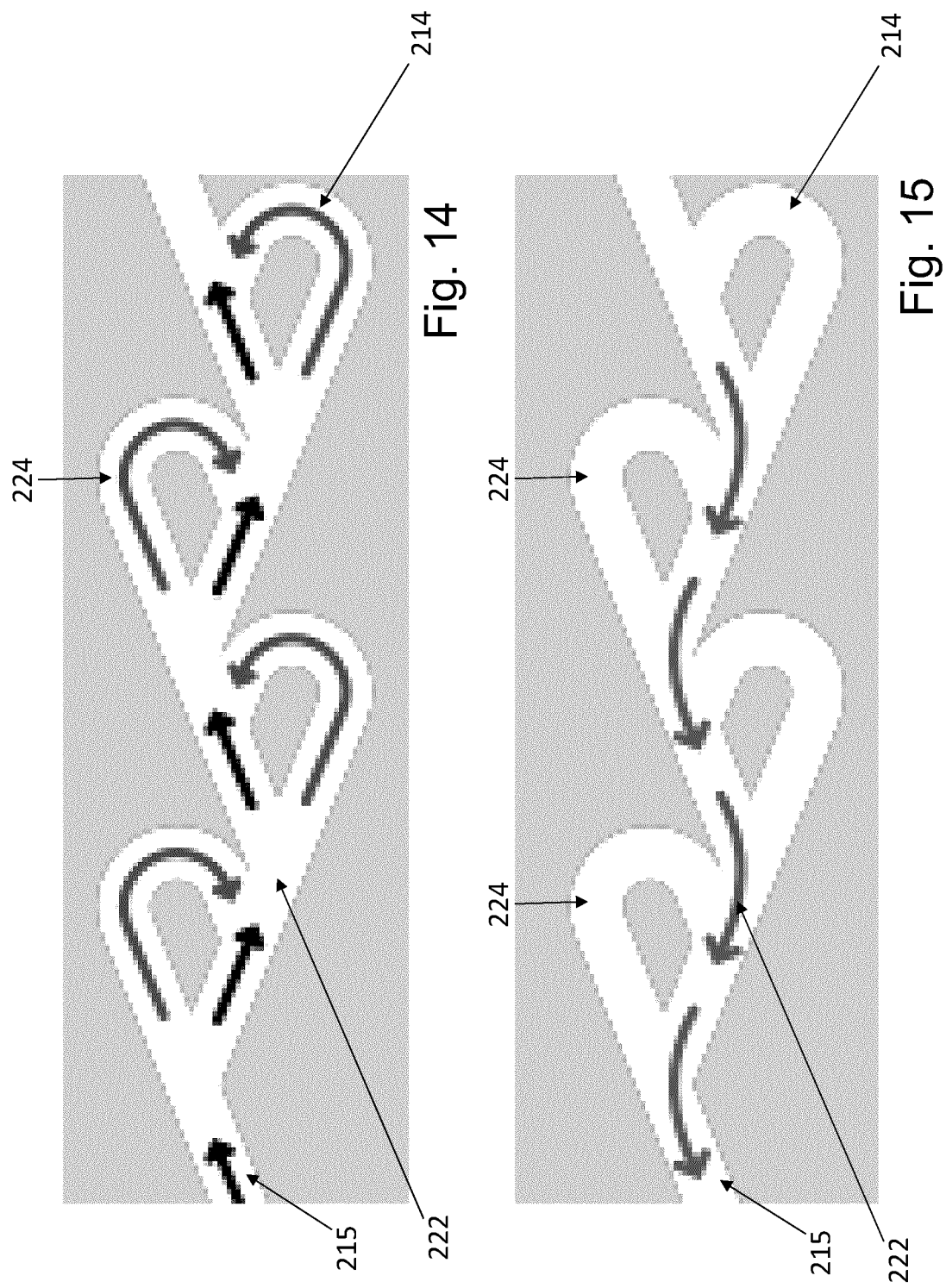
FIGS. 14 and 15 are representations of another implementation of the fluid channel.

As seen in FIGS. 14 and 15, the groove 215 of the fluid channel 214 can have a central path 222 and a plurality of bends 224 extending from the central path. This configuration of the groove 215 defines a fixed-geometry passive check valve. In other words, the groove 215 allows a fluid to flow preferentially in one direction, without moving parts. The fluid channel 214 can be configured as a Tesla valve, which is known in the art and therefore will not be described further.

It should thus be noted that fluids flowing along the groove 215 can sustain a pressure drop when flowing in the restricted direction due to its configuration. In some implementations, the groove 215 can extend circumferentially around the valve sleeve 210, or extend generally straight between the channel inlet and outlet. It is noted that, if the groove 215 has a smaller width, it may require a shorter length to enable similar flow restriction properties than a wider groove with a longer length, for example. In this implementation, the groove 215 can alternatively, or additionally, double back on itself one or more times, for instance, rather than simply "spiral" around the valve sleeve 210.

With reference to FIG. 12, the production valve assembly 200 can further include a flow control device, or flow adjuster 230 operatively coupled to the valve housing 202 and configured to further control the flowrate of fluids flowing between the reservoir and the fluid passage 204. The flow adjuster 230 can be adapted to selectively close or occlude the production port 208, thereby simultaneously occluding the channel inlet 216. As will be described further below, the flow adjuster 230 is configured to autonomously close and open the production port 208 in order to prevent and enable fluid communication between the reservoir and the fluid passage at desired intervals or time periods. Operation of the flow adjuster 230 can be accomplished via pressure fluctuations within the production valve 200 (e.g., along the wellbore string), within the reservoir, or both. It should therefore be understood that, as used herein, the expression "autonomous" can refer to the ability of a mechanism or system to self-regulate during standard operations. For instance, during injection and/or production operations of the well, pressures between the wellbore string and the reservoir (e.g., the pressure differential) fluctuates. As such, the flow adjuster 230 actuates based on the pressure differential to establish or prevent fluid communication between the various valves of the wellbore string (e.g., the production valve 200) and the surrounding reservoir.

Figure 13:
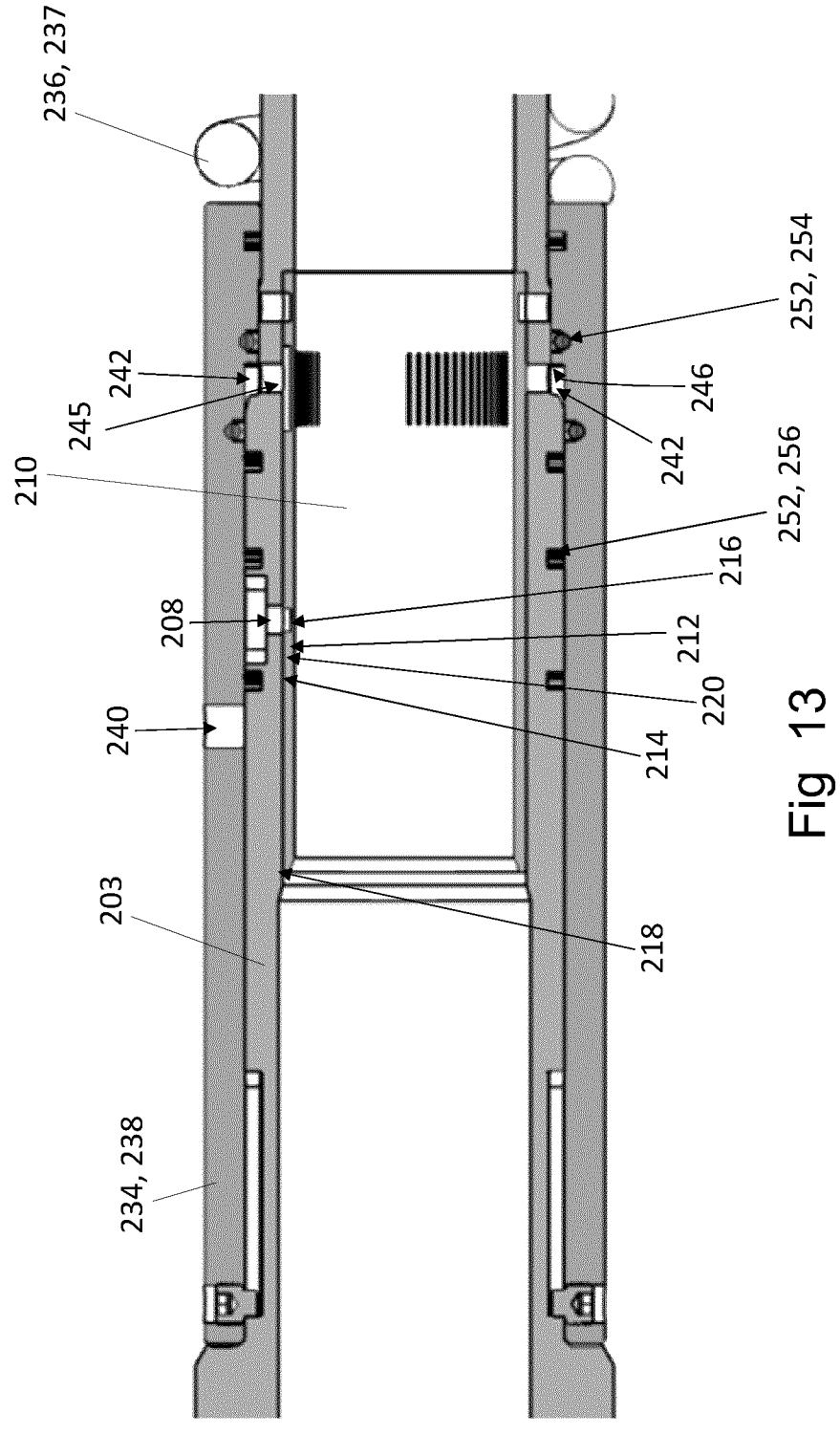
FIG. 13 is an enlarged view of the production valve assembly shown in FIG. 12, showing an outer port occluded by the tubular wall of the production valve housing, according to an implementation.

In this implementation, the flow adjuster 230 includes a piston mechanism 232 having a piston body 234 operatively coupled to the valve housing 202, such as coupled about the tubular wall 203, and a biasing element 236, such as a spring 237, operatively connected to the piston body 234. The piston body 234 can include an outer barrel 238 coupled to the tubular wall 203 in a manner allowing the outer barrel to slide, or shift, from one position to another along a length of the tubular wall. The outer barrel 238 includes an outer port 240, or outlet, adapted to establish fluid communication between the valve housing 202 and the reservoir. More particularly, the outer barrel is operable to slide along the valve housing to align the outer port 240 with the production port 208, thereby establishing fluid communication between the reservoir and the production port/channel inlet, or slide along the valve housing to occlude the production port 208, thereby preventing fluid communication between the reservoir and the production port/channel inlet. In this implementation, the outer barrel 238 is adapted to occlude the production port 208, for example, by having a solid portion thereof overlay the production port 208. In the implementation of FIGS. 12 and 13, the portion of the outer barrel 238 occluding the production port 208 is downhole relative to the outer port 240. However, it should be noted that the outer barrel 238 can alternatively, or additionally, include an occluding portion provided uphole of the outer port 240. It is therefore appreciated that, to produce fluid from the reservoir, fluids flow through the aligned outer port 240 and production port 208 into the fluid channel 214 via the channel inlet 216 and flows along the channel, and finally through the channel outlet 208 which communicates with the fluid passage 204. Once within the fluid passage 204, fluids can be produced up to surface via any suitable method.

As seen in FIG. 13, the piston mechanism 232 can define a piston chamber 242 between the outer barrel 238 and the valve housing 202. In this implementation, the valve housing 202 includes a piston chamber inlet 245 establishing fluid communication between the fluid passage 204 and the piston chamber 242 to enable fluid to pressurize the piston chamber. The piston chamber 242 includes a piston surface 246 against which fluid pressure can act to shift the outer barrel 238 in order to move the outer port 240 relative to the production port 208. In this implementation, the piston surface 246 corresponds to a radial surface of the outer barrel 238. However, it is appreciated that other configurations are possible and may be used.

It should be noted that when the fluid pressure within the fluid passage 204 and piston chamber 242 (e.g., internal pressure) is higher than the reservoir pressure (e.g., external pressure), the outer barrel can shift, such as in the downhole direction, against the bias of the spring 237. It is noted that the internal pressure can be made to increase during injection operations, where fluids are pumped down into the wellbore string. Moreover, the configuration of the fluid channel 214 restricts fluid flow along the fluid channel 214 from the outlet 218 toward the inlet 216, which further increases the pressure differential between the internal and external pressures. Inversely, reducing the internal fluid pressure such that the external pressure is greater than the internal pressure enables the spring 237 to bias the outer barrel 238, such as in the uphole direction, back in its original position. It is noted that the external pressure can be made to be greater than the internal pressure during production operations. In addition, it should be noted that, in this implementation, the original or "neutral" position of the piston mechanism 232 includes the outer port 240 being aligned with the production port 208. As such, during injection operations, the piston mechanism is fluid-pressure actuated to shift the outer barrel 238 in order to occlude the production port 208.

Referring to FIGS. 12 and 13, the valve sleeve 210 overlays the piston chamber inlet 245, with the channel inlet 216 being positioned to communicate with the piston chamber inlet 245, and therefore enable fluid flow within the piston chamber 242. As will be further described below, fluid flowing through the channel outlet 216 increases the internal pressure, partly due by the fluid channel configuration (e.g., the Tesla valve configuration), which pressurizes the piston chamber 242. Fluid pressure then applies a force on the piston surface 246 in order to shift the outer barrel 238, which moves the outer port 240 from alignment with the production port 208, thereby blocking fluid communication between the production valve 200 and the reservoir.

In this implementation, the production valve assembly 200 includes a sealing assembly 250 adapted to at least partially seal interstices between the outer barrel 238 and the valve housing 202. The sealing assembly 250 can include a plurality of seals 252 disposed in respective radial grooves defined along the outer surface of the tubular wall 203, the inner surface of the outer barrel 238, or a combination thereof. In some implementations, the seals 252 include installation seals 254 configured to prevent any fluid flow through interstices between the outer barrel 238 and the tubular wall 203, and operational seals 256 configured to partially prevent fluid flow through interstices between the outer barrel 238 and the tubular wall 203.

As seen in FIG. 13, the sealing assembly 250 can include a pair of installation seals 254 installed about the tubular wall 203 and provided on either side of the piston chamber inlet 245. For example, the installation seals 254 can include polymer-based seals, such as O-rings, disposed between the outer barrel 238 and the tubular wall 203. As such, increasing the fluid pressure within the piston chamber 242 is facilitated by the presence of the installation seals 254 that prevent leaks through the interstices of the injection valve assembly and provides friction forces to at least partially prevent movement of the outer barrel 238 as the internal fluid pressure gradually increases.

Figure 16:
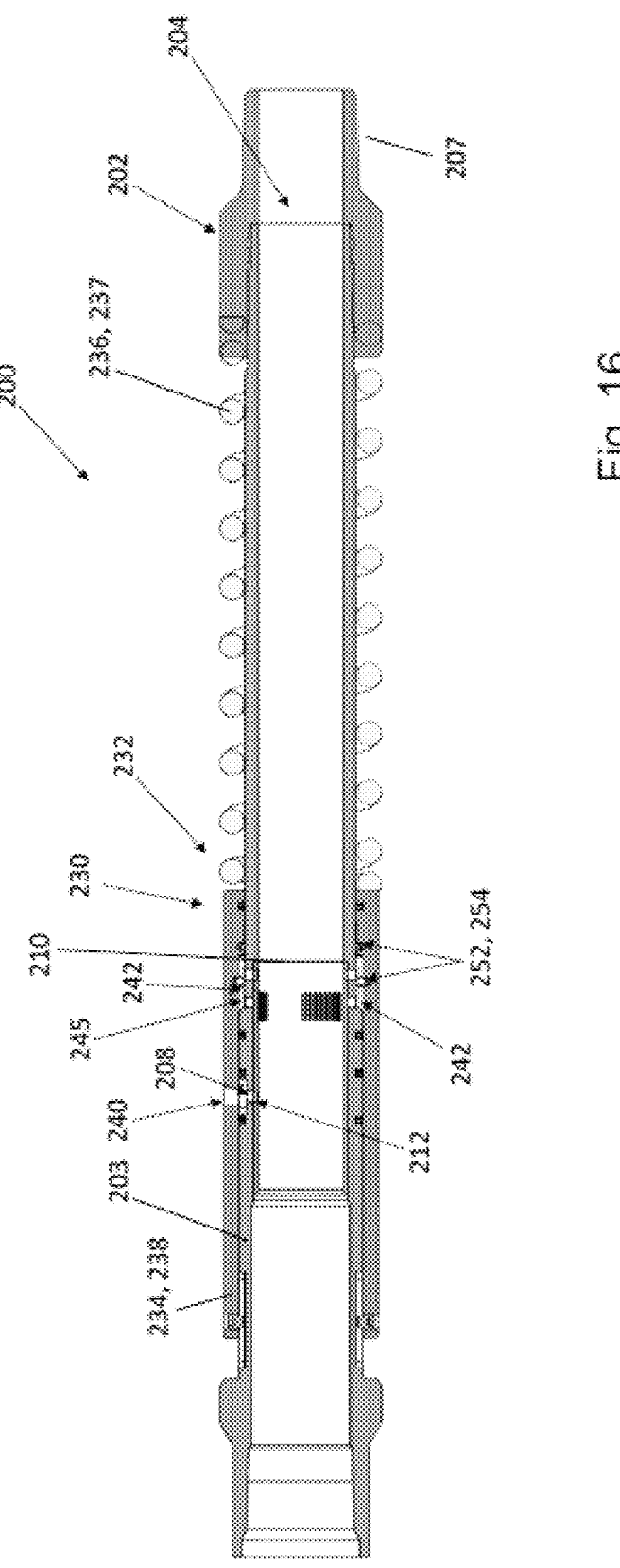
FIG. 16 is a cross-sectional view of the production valve assembly shown in FIG. 12, showing the valve assembly is an open configuration, according to an implementation.

With reference to FIG. 16, once the outer barrel 238 shifts downhole, e.g., due to the increasing fluid pressure, the outer barrel disengages the installation seals 254, and fluid communication between the piston chamber inlet 245 and the fluid channel is established. The outer barrel 238 remains in sealing engagement with the tubular wall 203 via the operational seals. In this implementation, the operational seals of the production valve 200 are similar, or identical, to the operational seals described above in relation with the injection valve 100, and thus provide the same functions.

Figure 17:
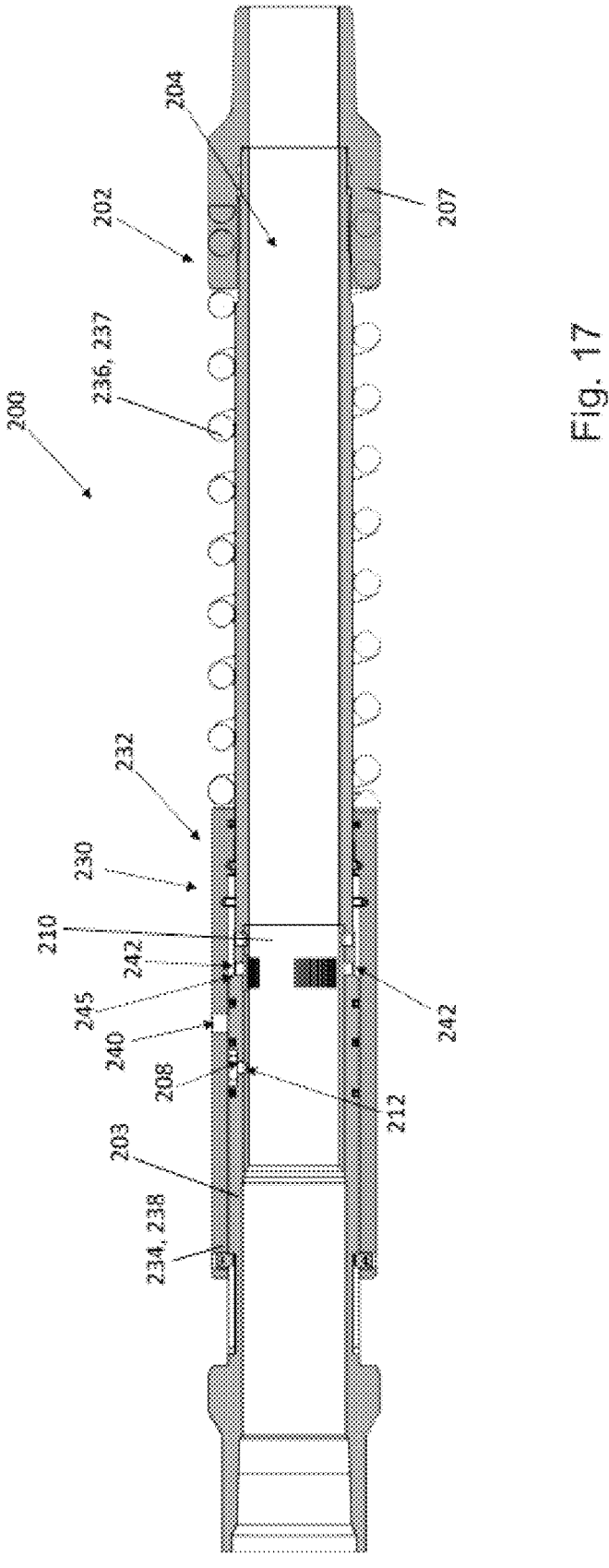
FIG. 17 is a cross-sectional view of the production valve assembly shown in FIG. 12, showing the valve assembly is a closed configuration, according to an implementation.

Referring broadly to FIGS. 12 to 17, the production valve assembly 200 can be configurable between an installation configuration (or "run-in" configuration), seen in FIG. 12, where the wellbore string can be deployed down the wellbore and fluids can gradually start flowing along the fluid passage 204; a closed configuration, seen in FIG. 17, where fluids flow along the fluid passage 204, but fluid communication between the wellbore string and the reservoir via the production valve assembly is prevented; and an open configuration, seen in FIG. 16, where fluid communication between the wellbore string and the reservoir via the production valve assembly is established.

Referring more specifically to FIGS. 12 and 13, the production valve assembly 200 is illustrated in the installation configuration. The flow adjuster 230 is configured to position the outer barrel 238 to position the outer port 240 adjacent the production port 208. As mentioned, the outer barrel 238 engages the sealing assembly 250, including both the installation and operational seals 254, 256, when in the installation configuration. As such, the piston chamber 242 is fluidly sealed and fluid pressure can gradually increase along the fluid passage 204 (and within the piston chamber) without actuating the piston mechanism 232 (e.g., without displacing the outer barrel 238). In some implementations, the outer barrel 238 can be releasably coupled to the tubular wall 203 with shear pins extending radially through the outer barrel 238 and into the tubular wall 203.

The installation configuration of the production valve assembly 200 can be useful for performing interventionless pressure tests downhole (e.g., down the wellbore) as the production valve assembly remains closed and prevents fluid communication between the fluid passage 204 and the surrounding reservoir. More particularly, the pressure differential between the internal pressure (e.g., the pressure within the production valve assembly) and the external, or reservoir pressure governs, at least in part, the operation of the flow adjuster 230, including the possible movements of the outer barrel 238. As such, and for example, the internal pressure can be increased to match, and eventually surpass the reservoir pressure, which activates the flow adjuster 230. Once the flow adjuster is activated, the reservoir pressure can be estimated based on the monitored tubing pressure.

In some implementations, activating the flow adjuster 230 can correspond to configuring the production valve assembly 200 from the installation configuration to one of the closed and open configurations. For instance, increasing the internal pressure of the fluid passage 204 to surpass the external pressure of the reservoir actuates the piston mechanism 232 and the outer barrel 238 is shifted downhole, thereby disengaging the installation seals. With reference to FIG. 16, the valve assembly 200 is shown in the open configuration, where the outer barrel 238 no longer engages or contacts the installation seals 254 and is adapted to slide along the tubular wall 203. As illustrated, when in the open configuration, the outer port 240 is shifted to align with the production port 208 such that fluid communication between the fluid passage and the reservoir is enabled.

Referring to FIGS. 12, 16 and 17, the spring 237 of the piston mechanism 232 illustratively abuts against a surface of a bottom sub 207. Once the flow adjuster is activated and shifted downhole to disengage the installation seals 254, the spring 237 compresses. It should thus be understood that increasing the internal pressure further shifts the outer barrel 238 downhole (i.e., autonomously), thereby compressing the spring 237 and moving the outer port into or from alignment with the production port 208. In other words, the production valve assembly is configurable between the open configuration and the closed configuration by increasing and lowering the internal pressure. It is appreciated that upon decreasing the internal pressure, the spring 237 will bias the outer barrel uphole as the spring returns to its neutral position, thereby configuring the production valve assembly back to the open configuration or installation configuration.

Still referring to FIG. 12, in this implementation, the production valve assembly 200 includes guiding elements 260 configured to guide the movement of the outer barrel 238 as it slides along the tubular wall 203. The guiding elements 260 of the production valve 200 can be similar, or identical to the guiding elements described above in relation with the injection valve, and can thus function in a similar, or identical manner.

As previously mentioned, the injection and production valve assemblies can be integrated as part of a wellbore string which is deployed in a wellbore to perform various operations. In some implementations, the wellbore string can be made up of conduits, packers and valve assemblies for the injection of fluids and/or the recovery of hydrocarbons, or other wellbore fluids. It is noted that recovering fluids from an underground formation can be enhanced by fracturing the formation in order to form fractures through which fluids can flow from the reservoir into the wellbore. Fracturing can be performed prior to primary recovery where fluids, such as hydrocarbons, are produced to the surface without imparting energy into the reservoir. Fracturing can be performed in stages along the well to provide a series of fractured zones in the reservoir. Following primary recovery, it can be of interest to inject fluids to increase reservoir pressure and/or displace hydrocarbons as part of a secondary recovery phase. Tertiary recovery can also be performed to increase the mobility of the hydrocarbons, for example by injecting mobilizing fluid, e.g., via the valve assembly described herein, and/or heating the reservoir. Tertiary recovery of oil is often referred to as enhanced oil recovery (EOR). Depending on various factors, primary recovery can be immediately followed by tertiary recovery without conducting any secondary recovery. In addition, some recovery operations include elements of pressurization and displacement as well as mobilizing of the hydrocarbons.

It should therefore be noted that, as secondary and/or tertiary recovery is conducted, the reservoir pressure can fluctuate due to the injection of fluids therein and the displacement of hydrocarbons. As such, the valve assemblies installed along the well can be provided with the autonomous flow control devices of the present disclosure. As such, during injection operations, the injection valves are opened and configured, via the autonomous flow control device, to achieve, and maintain, an even flow distribution along the entire well (e.g., in each injection stage of the well), while the production valves are closed. Moreover, during production operations, the production valves are autonomously shifted to their open configuration, while the injection valves are autonomously shifted to their closed configurations.

The valve assemblies can alternatively, or additionally be adapted to define an intentional, desired, or custom flow distribution across the entire wellbore, or across various stages of the wellbore, for either injection operations, production operations, or both. It is therefore appreciated that some stages of the wellbore can be provided with one or more valve assemblies adapted to enable fluid communication at a certain flowrate, which might be greater or less than the flowrate of another valve assembly, provided along another wellbore stage (or within the same wellbore stage). These valve assemblies can also be referred to as "autonomous pressure regulating flow valves". It is also noted that, because pressure isolating packers are installed between each stage of the well, each valve assembly and their corresponding autonomous flow control device react to the reservoir pressure independently from one another. The autonomous flow control device therefore offsets the requirement of swapping flow control devices in the well with fixed orifice sizes, for example. The autonomous flow control device also alleviates the task of determining the orifice size required for a well, as the autonomous flow control device of the injection valves covers a range of orifice sizes.

It is noted that one or more of the valve assembly can be implemented in various wellbores, formations, and for various applications including hydrocarbon recovery and geothermal applications. In some implementations, the wellbore can be straight, curved, or branched, and can have various wellbore sections. A wellbore section should be considered to be an axial length of a wellbore. A wellbore section can be characterized as "vertical" or "horizontal" even though the actual axial orientation can vary from true vertical or true horizontal, or can tend to undulate or corkscrew or otherwise vary. The term "horizontal", when used to describe a wellbore section, refers to a horizontal or highly deviated wellbore section as understood in the art, such as a wellbore section having a longitudinal axis that is between 70 and 110 degrees from vertical. For simplicity, it is noted that most of the conduits, channels, passageways, pipes, tubes and/or other similar components referred to in the present disclosure have a cross-section that is preferably circular or annular, although it should be appreciated that other shapes are also possible.

The injection and/or production valve assemblies can be installed within the well for any other operation, such as injecting fluid as part of a waterflooding or gas flooding process, or via a cyclic process, such as "huff and puff".

Other applications are also possible using the valve assemblies described herein, such as geothermal applications, solution mining operations, frac-to-frac operations (synchronous and/or asynchronous), or any other applications in which improved and interventionless control of fluids flowrates are desired or required.

In some implementations, the injection fluid can be a liquid, such as water, or a gas, such as vapour phase $CO_2$, or a combination thereof depending on the process being implemented. The injection fluid can be miscible or immiscible with the oil in the reservoir. The injection fluid could be field gas or enriched field gas, methane, methane blends, nitrogen, air, ethane, light gaseous hydrocarbons, or other gases or mixtures of such gases that may be suitable for secondary or tertiary recovery. The selection of the fluid can be based on various reservoir properties. It is noted that the injection fluid can depend on the EOR method being used, and that the valves can be designed and implemented depending on the type of injection fluid to be used and/or depending on various criterions, such as injection flowrates and pressures, for example.

It should be appreciated from the present disclosure that the various implementations of the valve assemblies and related components enable the injection valve assembly to autonomously adjust the degree of flow restriction of an injection fluid path to maintain the flowrate into the reservoir relatively constant. Maintaining an even, desired, custom or generally constant flowrate across multiple valve assemblies defines an even flow distribution along the different stages of the wellbore. The flow restriction component, or flow regulator of each injection valve assembly autonomously and selectively restricts the flow of fluid into the reservoir by aligning an outlet port with different injection ports which communicate with respective portions of a fluid channel based on the pressure differential between the valve assembly and the surrounding reservoir. Similarly, the production valve assemblies are configured to autonomously open and closed based on the pressure differential between the valve assembly and the surrounding reservoir. It is appreciated that the pressure differential acts in an opposite manner for the injection and production valves. For instance, the pressure differential required to open the injection valves closes the production valves, and vice versa.

The present disclosure may be embodied in other specific forms without departing from the subject matter of the claims. The described example implementations are to be considered in all respects as being only illustrative and not restrictive. For example, the valve assembly can be provided with one or more dissolvable inserts (e.g., instead of installation seals/O-rings and/or shear pins) to prevent initial injection/production or valve activation, for instance, during installation of the valve assembly. For example, the dissolvable inserts can be provided within the piston chamber, thereby initially, and/or temporarily, blocking fluid flow through the piston chamber outlet. Alternatively, it is appreciated that the valve assembly can be devoid of installation seals, thereby being installed "activated", either in the open configuration or the closed configuration. For some applications, such as for heavy oil operations, the valve assembly can be provided with thermally activated wax (or any other similar or suitable material) adapted to provide the spring force via a temperature change, and use that spring force to control the injection and/or production rates.

In an implementation, the valve assembly can be operated via the selection of (e.g., the alignment with) the valve inlet position (e.g., instead of the outlet position). In some implementations, the flow regulator may be adapted to move, or a separate piston may move, or the regulator may be integrated into the piston, alternatively, or additionally to the other structural features described herein. In an alternate implementation, the valve assembly can be provided with a fluid-filled compressible chamber (e.g., nitrogen) to provide a nonlinear spring effect in a more compact package. In yet another possible implementation, the entire wellbore can be provided with a plurality of the valve assembly, thereby defining an injection-limited wellbore. This type of valve assembly configuration can be used for injection, acidizing or as a frac tool (e.g., using propane, nitrogen, etc.).

In yet another possible implementation, the outlet of the flow regulator channel and/or the housing port(s) can be provided with a screen, or another similar filtering device. In one implementation, the valve assembly can be preconfigured in an open position, such as having the outer barrel be "pre-aligned" with the first housing (or top-most) port. The first housing port can be provided with a flow control apparatus, such as a check valve, integrated into the housing port to check for reverse flow, for example.

In yet another possible implementation, the described valve assemblies (e.g., injection and/or production valves) can be run downhole "upside down". More particularly, in this implementation, what is described herein as the top and bottom subs would be swapped, and the spring of the valve assembly would be positioned uphole of the flow adjuster barrel and in engagement with the top sub (e.g., instead of with the bottom sub).

Although described separately as an injection valve assembly and a production valve assembly, it should be noted that each design can be adapted to provide outflow and inflow regulation, such that each design can be used for injection and/or production operations along the wellbore. For example, the Tesla valve configuration can be implemented and used as part of the injection valve.

The present disclosure intends to cover and embrace all suitable changes in technology. The scope of the present disclosure is, therefore, described by the appended claims rather than by the foregoing description. The scope of the claims should not be limited by the implementations set forth in the examples but should be given the broadest interpretation consistent with the description as a whole.

As used herein, the terms "coupled", "coupling", "attached", "connected" or variants thereof as used herein can have several different meanings depending on the context in which these terms are used. For example, the terms coupled, coupling, connected or attached can have a mechanical connotation. For example, as used herein, the terms coupled, coupling or attached can indicate that two elements or devices are directly connected to one another or connected to one another through one or more intermediate elements or devices via a mechanical element depending on the particular context.

In the above description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The implementations, geometrical configurations, materials mentioned and/or dimensions shown in the figures are optional, and are given for exemplification purposes only.

In addition, although the optional configurations as illustrated in the accompanying drawings comprises various components and although the optional configurations of the valve assembly as shown may consist of certain geometrical configurations as explained and illustrated herein, not all of these components and geometries are essential and thus should not be taken in their restrictive sense, i.e., should not be taken as to limit the scope of the present disclosure. It is to be understood that other suitable components and cooperations therebetween, as well as other suitable geometrical configurations may be used for the implementation and use of the valve assembly, and corresponding parts, as briefly explained and as can be easily inferred herefrom, without departing from the scope of the disclosure.

The invention claimed is:

1. A valve assembly for integration within a wellbore string disposed within a subterranean reservoir, comprising:

a valve housing comprising a tubular wall defining a fluid passage therethrough and having injection ports extending through the tubular wall;

an inner barrel mounted within the valve housing and comprising a fluid channel adapted to establish fluid communication between the fluid passage and the injection ports, the fluid channel having a channel inlet and being configured to create a fluid flowrate restriction between the fluid passage and the injection ports, each injection port being aligned with respective portions of the fluid channel to define respective flow path lengths extending between the channel inlet and the injection ports, each flow path length defining respective degrees of flowrate restriction; and a flow adjuster operatively connectable to the valve housing and comprising:

an outer barrel slidably coupled about the tubular wall and having an outlet in fluid communication with the reservoir, the outer barrel and the tubular wall defining a fluid chamber therebetween adapted to allow fluid flow therein, the outer barrel being adapted to shift along the tubular wall downhole upon pressurization of the fluid chamber to align the outlet with one of the injection ports and enable fluid communication between the fluid passage and the reservoir through the corresponding injection port; and a biasing element operatively connected to the outer barrel and being adapted to bias the outer barrel along the tubular wall uphole, wherein the valve assembly is configurable between:

an installation configuration, where the outer barrel is releasably secured to the tubular wall in an installation position where the outlet is occluded by the tubular wall, the injection ports are occluded by the outer barrel, and the fluid chamber is fluidly sealed from the fluid channel to prevent fluid communication between the fluid passage and the reservoir and facilitate pressurization of the fluid chamber;

a closed configuration, where the outer barrel is shifted to a closed position, where the outlet is occluded by the tubular wall, the injection ports are occluded by the outer barrel and the fluid chamber is in fluid communication with the fluid channel; and an open configuration, where the outer barrel is shifted to one of a plurality of open positions, where each open position includes the outlet being in fluid communication with a corresponding one of the injection ports such that fluid flow is restricted by a corresponding degree of flowrate restriction, the outer barrel occluding the other injection ports, and the fluid chamber being in fluid communication with the fluid channel to enable fluid communication between the fluid passage and the reservoir at an injection rate;

the flow adjuster being configured to autonomously shift the outer barrel from the installation position to the closed position, between the closed position and the open positions, and between different open positions based on a pressure differential between an internal pressure (Pi) of the fluid chamber and an external pressure (Pe) of the reservoir, wherein shifting the outer barrel between the different open positions maintains the injection rate between the fluid passage and the reservoir substantially constant.

2. The valve assembly of claim 1, wherein the flow adjuster is fluid-pressure actuatable to align the outlet with:

a first injection port defining a first flow path length (L1) when a fluid pressure within the fluid chamber is at a first internal pressure (Pi1); and a second injection port defining a second flow path length (L2) when the fluid pressure within the fluid chamber is at a second internal pressure (Pi2), where Pi2>Pi1>Pe, and wherein L2>L1.

3. The valve assembly of claim 2, wherein the outlet is adapted to be aligned with additional injection ports when the pressure with the fluid chamber increases to incremental internal pressures (Pix), wherein each injection port defines incrementally longer flow path lengths (Lx), wherein Pix>Pi2>Pi1>Pe, and wherein Lx>L2>L1.

4. A valve assembly for integration within a wellbore string disposed within a subterranean reservoir, comprising:

a valve housing comprising a tubular wall defining a fluid passage therethrough and having injection ports extending through the tubular wall;

a flow restriction component extending between the fluid passage and the injection ports to establish fluid communication therebetween, the flow restriction component being configured to create a flowrate restriction along a flow path length thereof, each injection port being aligned with respective portions of the flow restriction component to define respective flow path lengths defining respective degrees of flowrate restriction; and a flow adjuster operatively connectable to the valve housing and comprising an outlet in fluid communication with the reservoir, the flow adjuster being dynamically fluid-pressure actuatable to align the outlet between the injection ports such that fluid flow between the fluid passage and the reservoir is restricted by a corresponding degree of flowrate restriction to maintain an injection rate substantially constant.

5. The valve assembly of claim 4, wherein the fluid passage has an internal pressure (Pi), and the reservoir has an external pressure (Pe), and wherein the valve assembly is operable in an installation configuration, where the outlet is occluded by the tubular wall and each injection port is occluded by the flow adjuster to prevent fluid communication between the fluid passage and the reservoir to facilitate increasing the internal pressure.

6. The valve assembly of claim 5, wherein the valve assembly is operable from the installation configuration to an open configuration where the flow adjuster is fluid-pressure actuated to align the outlet with one of the injection ports when the internal pressure is greater than the external pressure.

7. The valve assembly of claim 6, wherein the valve assembly is operable from the open configuration to a closed configuration where the flow adjuster is actuated to occlude the injection ports when the external pressure is greater than the internal pressure.

8. The valve assembly of claim 7, wherein the flow adjuster comprises a flow adjuster barrel slidably coupled to the tubular wall and having the outlet extending therethrough, the flow adjuster barrel being adapted to slide along the tubular wall in a first direction when the internal pressure is greater than the external pressure, and in a second direction when the external pressure is greater than the internal pressure.

9. The valve assembly of claim 8, wherein the flow adjuster barrel is coupled about an outer surface of the tubular wall, and wherein the flow adjuster barrel and the tubular wall define a chamber therebetween having a chamber inlet in fluid communication with the fluid passage, the flow adjuster barrel comprising a radial surface defining a portion of the chamber, and wherein the flow adjuster barrel is adapted to slide along the tubular wall in the first direction as the internal pressure increases and fluid pressure applies a force on the radial surface.

10. The valve assembly of claim 9, wherein the chamber comprises a chamber outlet in fluid communication with the fluid channel, and wherein, when in the installation configuration and a closed configuration, the chamber outlet is occluded by the flow adjuster barrel.

11. The valve assembly of claim 9, further comprising a sealing assembly, comprising:

installation seals installed on either side of the chamber inlet and configured to prevent fluid flow through interstices between the flow adjuster barrel and the tubular wall; and operational seals installed between the flow adjuster barrel and the tubular wall to restrict fluid flow through interstices between the flow adjuster barrel and the tubular wall.

12. The valve assembly of claim 11, wherein the operational seals comprise laminar seals made up of a plurality of rings arranged side by side in radial grooves defined about the tubular wall.

13. The valve assembly of claim 12, wherein each ring defines a gap with the tubular wall, and wherein the gaps define a tortuous path through the laminar seal to restrict fluid flow therethrough.

14. The valve assembly of claim 11, wherein the flow adjuster barrel is adapted to be in sealing engagement with the tubular wall via the installation seals and the operational seals when in the installation configuration, and wherein the flow adjuster barrel is adapted to disengage the installation seals when operating the valve assembly from the installation configuration to the open configuration or the closed configuration.

15. The valve assembly of claim 7, wherein the flow adjuster further comprises a biasing element operatively connected to the flow adjuster barrel, the biasing element being adapted to bias the flow adjuster barrel along the tubular wall in the second direction.

16. The valve assembly of claim 15, wherein the biasing element comprises a spring coiled about the tubular wall between the flow adjuster barrel and a bottom sub of the valve housing, and wherein, when in the installation configuration, the spring is spaced from the bottom sub, and when in the open configuration, the spring engages the bottom sub and is configured to be compressed between the bottom sub and the flow adjuster barrel.

17. The valve assembly of claim 16, wherein the spring is configured to create a compressive force to bias the flow adjuster barrel along the tubular wall in the second direction, and wherein a combination of the external pressure and the compressive force are substantially equivalent to the internal pressure when operating the valve assembly in the open configuration.

18. The valve assembly of claim 16, wherein the spring is adapted to return toward a neutral position when the external pressure is greater than the internal pressure in order to shift the flow adjuster barrel in the second direction, and wherein operating the valve assembly in the closed configuration includes having the spring in the neutral position.

19. The valve assembly of claim 5, wherein the flow adjuster is adapted to align the outlet with injection ports defining longer flow path lengths as the internal pressure increases in order to maintain the injection rate between the fluid passage and the reservoir substantially constant.

20. A well completion system comprising:

a wellbore string comprising:

a plurality of valve assemblies installed in respective stages of a wellbore, each comprising:

a valve housing comprising a tubular wall defining a fluid passage therethrough and having injection ports extending through the tubular wall;

a flow restriction component extending between the fluid passage and the injection ports to establish fluid communication therebetween, the flow restriction component being configured to create a fluid flow-rate restriction along a flow path length, each injection port being aligned with respective portions of the flow restriction component to define respective flow path lengths defining respective degrees of flowrate restriction;

a flow adjuster operatively connectable to the valve housing and comprising an outlet in fluid communication with the reservoir, the flow adjuster being fluid-pressure actuatable based on a pressure differential between an internal pressure of the valve assembly and an external pressure of the corresponding stage of the reservoir to align the outlet with one of the injection ports such that fluid flow between the fluid passage and the reservoir is restricted by a corresponding degree of flowrate restriction to maintain an injection rate in each stage substantially constant to define a generally even or desired flow distribution along the wellbore; and a plurality of conduits connecting the valve assemblies in spaced-apart relation along the wellbore, the conduits being configured to establish fluid communication between the valve assemblies.

\* \* \* \* \*